United States Patent
Hayakawa

[19]

[11] Patent Number: 5,946,501
[45] Date of Patent: Aug. 31, 1999

[54] WATERPROOF AND/OR WATER-RESISTANT CAMERA

[75] Inventor: Masahiro Hayakawa, Tokyo, Japan

[73] Assignee: Asahi Kogaku Kogyo Kabushiki Kaisha, Tokyo, Japan

[21] Appl. No.: 08/916,046

[22] Filed: Aug. 21, 1997

Related U.S. Application Data

[62] Division of application No. 08/446,508, May 22, 1995, Pat. No. 5,713,048.

[30] Foreign Application Priority Data

| May 24, 1994 | [JP] | Japan | 6-110038 |
| Jun. 30, 1994 | [JP] | Japan | 6-7795 |
| Jul. 14, 1994 | [JP] | Japan | 6-8457 |
| Jul. 14, 1994 | [JP] | Japan | 6-8458 |

[51] Int. Cl.⁶ .................................................. G03B 17/08
[52] U.S. Cl. .............................................. 396/25; 396/29
[58] Field of Search .......................... 396/25, 26, 27, 396/28, 29; 348/81; 206/316.1, 316.2; 277/604, 630, 637, 644, 921

[56] References Cited

U.S. PATENT DOCUMENTS

| 2,705,655 | 4/1955 | Brown et al. | 277/921 |
| 3,036,506 | 5/1962 | Andresen, Jr. | 396/27 |
| 3,640,424 | 2/1972 | Ando | 396/25 |
| 4,072,245 | 2/1978 | Sloan, Jr. | 277/921 |
| 4,208,118 | 6/1980 | Urano et al. | 396/536 |
| 4,510,664 | 4/1985 | Lock | 277/604 |
| 4,690,414 | 9/1987 | Haaland | 277/604 |
| 4,803,504 | 2/1989 | Maeno et al. | 396/29 |
| 4,934,716 | 6/1990 | Nordin et al. | 277/604 |
| 5,294,988 | 3/1994 | Wakabayashi et al. | 396/27 |
| 5,305,032 | 4/1994 | Arai | 396/27 |
| 5,335,028 | 8/1994 | Kosako | 396/29 |
| 5,374,970 | 12/1994 | Satoh et al. | 396/29 |

FOREIGN PATENT DOCUMENTS

| 62-194248 | 12/1987 | Japan . |
| 61-241978 | 4/1988 | Japan . |
| 63-96644 | 4/1988 | Japan . |

*Primary Examiner*—Eddie C. Lee
*Attorney, Agent, or Firm*—Greenblum & Bernstein, P.L.C.

[57] ABSTRACT

A waterproof and/or water-resistant camera includes a camera body having an opening. An openable cover is connected to the camera body for opening and closing the opening, an elastic sealing member is provided on the cover and surrounding the opening, and a contacting surface is formed on the camera body around the opening, with which the sealing member comes into pressing contact when the cover is closed. The contacting surface includes a tapered surface formed such that an inner end of the tapered surface is closer to the cover than an outer end of the tapered surface.

3 Claims, 21 Drawing Sheets

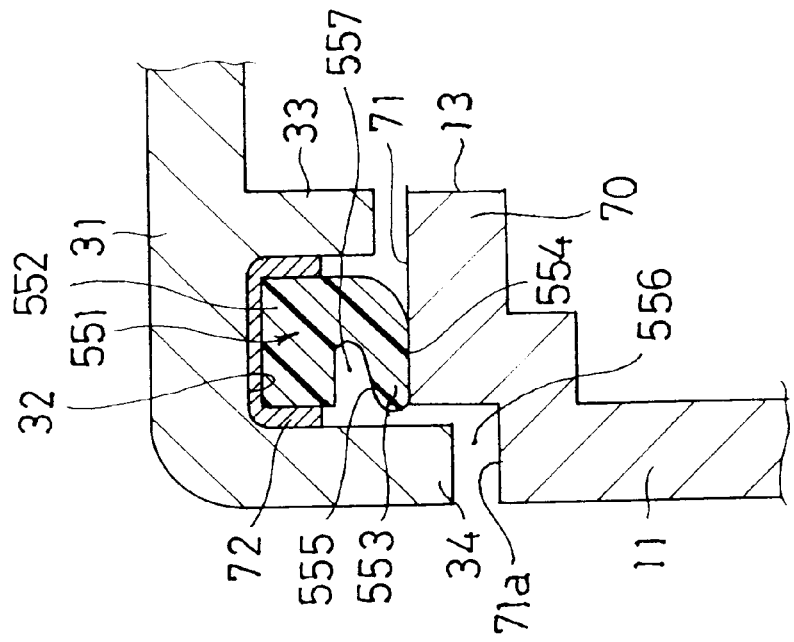
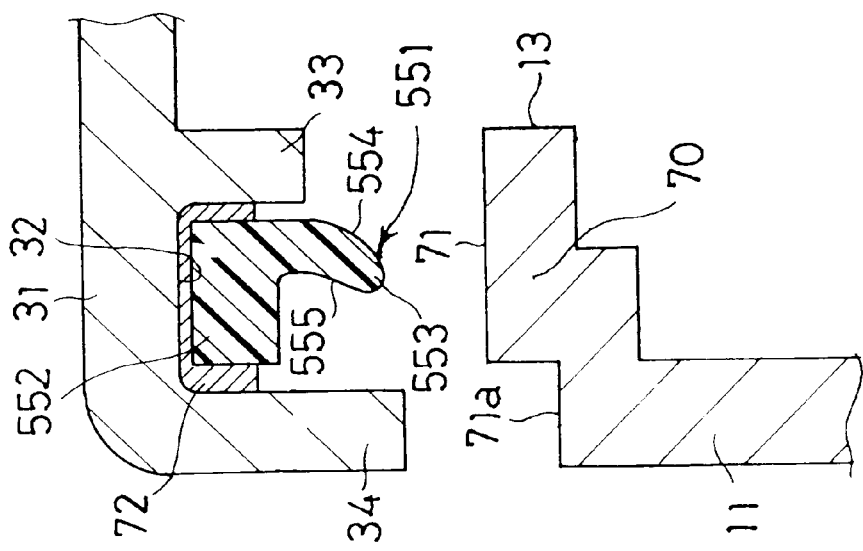

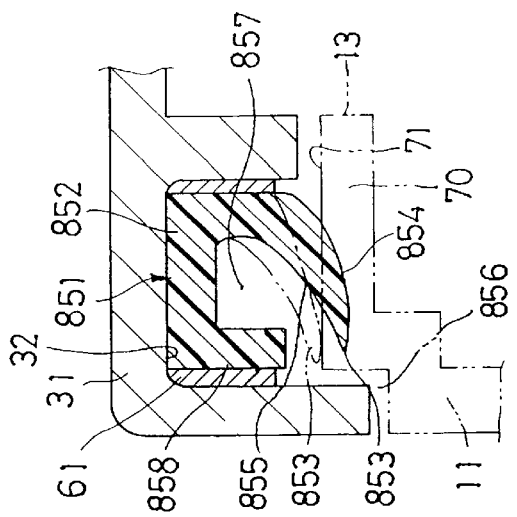
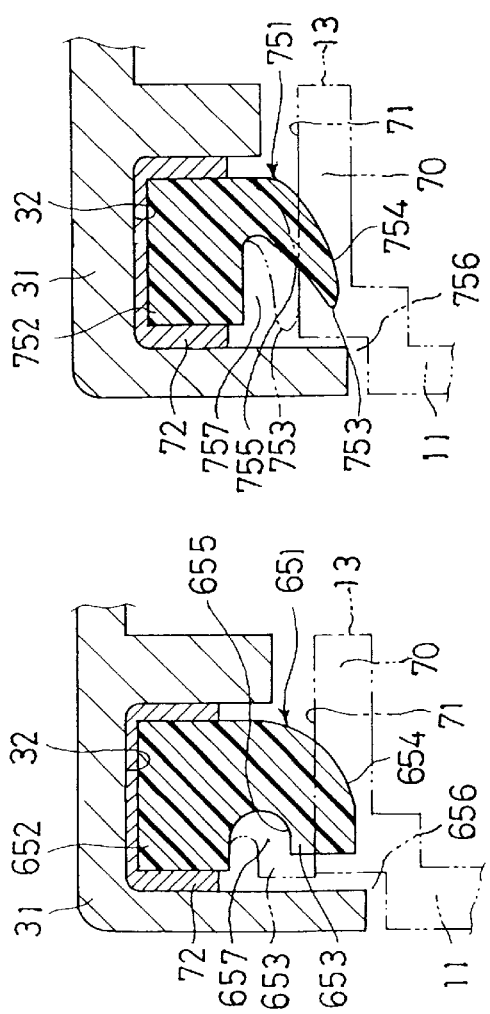

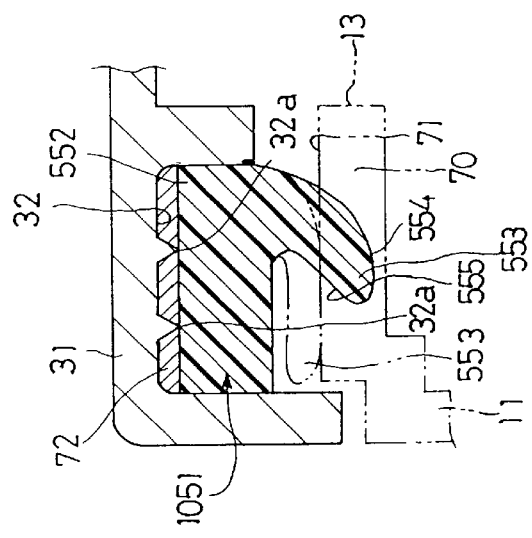
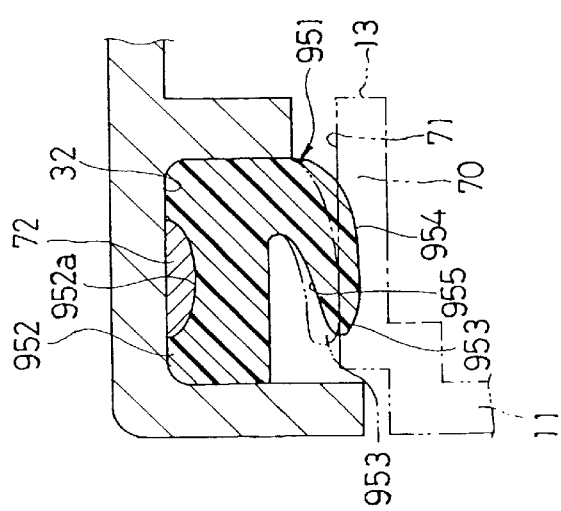

WATERPROOF AND/OR WATER-RESISTANT CAMERA

This application is a division, of application Ser. No. 08/446,508, filed May 22 1995, now U.S. Pat. No. 5,713,048.

BACKGROUND OF THE INVENTION

1. Field of the Invention

The present invention relates to a waterproof and/or water-resistant camera, and more precisely, to a waterproof and/or water-resistant camera having a watertight connection between the camera body and the openable back cover.

2. Description of Related Art

A water-resistant camera which does not allow drops of rain or water to enter the camera, e.g. in the rain or near the shore, and a waterproof camera which can take pictures even in shallow water, e.g. in a swimming pool or in seawater near the shoreline, are both available on the market.

In a conventional water-resistant and/or waterproof camera, the watertight connection between the camera body and the openable back cover is established such that a sealing member provided on the outer portion of the inside of the back cover is brought into pressing contact with a contacting surface of the camera body. The sealing member is made of an elastic or resilient material such as rubber and presses against both the camera body and the openable back cover by its biasing force when the back cover is closed.

The biasing force of the sealing member applied to the camera body and the back cover when the back cover is closed is quite large even though the biasing force of sealing member per unit is not so large. Due to this large biasing force, the back cover may become slightly deformed since the back cover usually does not have a large thickness and strength as compared with the associated camera body. Thereby, the portion of the back cover to which a sealing member is attached becomes uneven, resulting in a deterioration of the watertight connection between the camera body and the back cover.

Some conventional water-resistant and/or waterproof cameras have adopted the arrangement in which the contacting surface of the camera body with which the sealing member of the back cover is brought into pressing contact is formed such that the contacting surface is inclined to the pressing direction of the sealing member against the contacting surface in order to reduce the biasing force of the sealing member applied to the contacting surface, so that the back cover is not deformed by the biasing force. However, in the conventional water-resistant and/or waterproof camera of this type, in the case where the back cover is opened with the camera getting wet, it is often the case that drops of water on the inclined contacting surface travel along the surface and fall into the camera body.

SUMMARY OF THE INVENTION

One object of the present invention is to provide a waterproof and/or water-resistant camera in which the biasing force of the sealing member provided on the openable back cover which is applied to the contacting surface of the camera body is reduced while preventing drips of water on the contacting surface from falling into the camera body when the back cover is opened.

Another object of the present invention is to provide a waterproof and/or water-resistant camera in which the deterioration of the watertight connection between the camera body and the openable back cover can be minimized even after a long period of time has elapsed and/or even if the back cover should be slightly deformed due to the biasing force of the sealing member.

To achieve the object mentioned above, according to the present invention, there is provided a waterproof and/or water-resistant camera which includes: a camera body including an opening; an openable cover connected to the camera body for opening and closing the opening; an elastic sealing member provided on the cover and surrounding the opening; and a contacting surface formed on the camera body around the opening, with which the sealing member comes into pressing contact when the cover is closed. The contacting surface includes a tapered surface formed such that an inner end of the tapered surface is closer to the cover than an outer end of the tapered surface.

The cover may be a back cover pivotably connected to one side of the back of the camera body.

The cover may be provided with a groove to which the sealing member is fixed.

Preferably, the sealing member is formed to taper away from the cover, a tip of the sealing member coming into pressing contact with the contacting surface when the cover is closed.

The sealing member may have a substantially "L"-shaped cross section.

The sealing member may include more than one lip which surrounds the opening and comes into pressing contact with the contacting surface when the cover is closed.

Preferably, each lip is formed to taper away from the cover, a tip of each lip coming into pressing contact with the contacting surface when the cover is closed.

According to another aspect of the present invention, there is provided a waterproof and/or water-resistant camera which includes: a camera body including an opening; an openable cover connected to the camera body for opening and closing the opening; an elastic sealing member which is provided on the camera body or the cover and surrounds the opening; a contacting surface formed on the other of the camera body or the cover, with which the elastic sealing member comes into pressing contact with when the cover is closed; and an auxiliary pressing mechanism for pressing the elastic sealing member towards the contacting surface when the cover is closed.

The cover may be a back cover pivotably connected to one side of the back of the camera body.

The waterproof and/or water-resistant camera may further include a groove formed on one of the cover or the camera body around the opening, the sealing member being fixed to the groove.

Preferably, the auxiliary pressing mechanism includes: a pressure portion formed on the camera body or the cover on which the sealing member is provided; and an auxiliary elastic portion which is integrally formed with the sealing member and comes into pressing contact with the pressure portion when the cover is closed.

The pressure portion may include an inclined surface which inclines away from the sealing member.

The auxiliary elastic portion may be a raised portion adjacent to the inclined surface.

The sealing member may include a curved surface curving towards the outside of the camera, the curved surface coming into pressing contact with the contacting surface when the cover is closed.

The contacting surface may be formed on the camera body around the opening so as to taper towards the cover when the cover is closed.

The sealing member may include inner and outer tongues adjacent to each other, wherein the inner tongue comes into pressing contact with the contacting surface when the cover is closed, and further wherein a part of the outer tongue may be formed as the auxiliary elastic portion such that the pressure portion presses the inner tongue to the contacting surface through the auxiliary elastic portion when the cover is closed.

The inner tongue may be formed longer than the outer tongue in a direction perpendicular to the cover.

The contacting surface may be formed on the camera body around the opening so as to taper towards the cover when the cover is closed.

According to yet another aspect of the present invention, there is provided a waterproof and/or water-resistant camera which includes: a camera body including an opening; an openable cover connected to the camera body for opening and closing the opening; an elastic sealing member provided on the camera body or the cover and including a tongue portion surrounding the opening; a contacting surface formed on the other of the camera body or the cover, with which the tongue portion of the sealing member comes into pressing contact when the cover is closed; and the sealing member has a recess surrounding the tongue portion to which an external pressure is applied when the cover is closed so that the external pressure may press the tongue portion towards the contacting surface.

The external pressure is hydraulic pressure when the camera is used in water.

The cover may be a back cover pivotably connected to one side of the back of the camera body.

The waterproof and/or water-resistant camera may further include a groove formed of the cover or the camera body around the opening, the sealing member being fixed to the groove.

The sealing member may further include a base portion fixed to the groove, and wherein the tongue portion may be integrally formed with the base portion along the base portion.

The tongue portion may be formed so as to be elastically bent towards the outside of the camera when the cover is closed.

The looped tongue may be formed so as to be elastically bent towards the outside of the camera when the cover is closed.

The sealing member may have a substantially "u"-shaped cross section.

The sealing member may have a substantially "J"-shaped cross section.

The tongue portion may include a convex curved surface which comes into pressing contact with the contacting surface when the cover is closed.

The base portion may have a groove on the bottom of the base portion.

The groove may have at least one projection on the bottom of the groove.

The base portion may have inner and outer grooves formed along the base portion for receiving an adhesive used for fixing the sealing member to the groove.

According to yet another aspect of the present invention, there is provided a waterproof and/or water-resistant camera which includes: a camera body including an opening; an openable cover connected to the camera body for opening and closing the opening; an elastic sealing member provided on the camera body or the cover and having at least one tongue portion surrounding the opening; and a rib formed on the other of the camera body or the cover, the rib having a side wall. At least one tongue portion is brought into pressing contact with the side wall of the rib by deformation of the sealing member caused by depression by the rib when the cover is closed.

The cover may be a back cover pivotably connected to one side of the back of the camera body.

The waterproof and/or water-resistant camera may further include a groove formed on one of the cover or the camera body around the opening, the sealing member being placed in the groove with the sealing member compressed in the groove.

The sealing member may further include a base portion with which a tip of the rib comes into pressing contact when the cover is closed. At least one tongue portion is integrally formed with the base portion so that at least one tongue portion may be brought into pressing contact with the side wall of the rib by deformation of the base portion caused by the depression by the rib when the cover is closed.

The sealing member may include two tongue portions integrally formed with the base portion along opposite ends of the base portion, respectively, so that the two looped tongues may be brought into pressing contact with opposite side walls of the rib by deformation of the base portion caused by the depression by the rib when the cover is closed.

The sealing member may further include two leg portions integrally formed with the base portion along the opposite ends of the base portion, respectively, so that the sealing member may have a substantially "H"-shaped cross section.

The sealing member may further include two leg portions integrally formed with the base portion along opposite ends of the base portion, respectively, so that the sealing member may have a substantially "h"-shaped cross section.

According to yet another aspect of the present invention, there is provided a waterproof and/or water-resistant camera which includes: a camera body; an openable cover; an elastic sealing member provided on one of the camera body and the cover; and a rib which is formed on the other of the cover and the camera body and comes into pressing contact with the sealing member when the cover is closed. The sealing member includes a tongue portion which leans against and comes into pressing contact with the looped rib by deformation of the sealing member caused by the rib pressing the sealing member when the cover is closed.

According to yet another aspect of the present invention, there is provided a waterproof and/or water-resistant camera which includes: a camera body; an openable cover; an elastic sealing member provided on the camera body or the cover; and a rib which is formed on the other of the cover or the camera body and comes into pressing contact with the sealing member when the cover is closed. The sealing member includes two tongue portions which elastically hold the rib between the two tongue portions from opposite directions by deformation of the sealing member caused by the rib pressing the sealing member when the cover is closed.

The present disclosure relates to subject matter contained in a Japanese Patent Application No. 6-110038 (filed on May 24, 1994) and three Japanese Utility Model Applications No. 6-7795 (filed on Jun. 30, 1994), No. 6-8457 (filed on Jul. 14, 1994), and No. 6-8458 (filed on Jul. 14, 1994), which are expressly incorporated herein by reference in their entireties.

BRIEF DESCRIPTION OF THE DRAWINGS

The invention will be described below in detail with reference to the accompanying drawings, in which;

FIG. 14 is a cross-sectional view of a significant portion of a waterproof and/or water-resistant camera, with its back cover opened, to which the present invention is applied, according to the seventh embodiment of the present invention;

FIG. 15 is a cross-sectional view of the significant portion of the waterproof and/or water-resistant camera of FIG. 14, with its back cover closed;

FIG. 17 is a cross-sectional view of a significant portion of a waterproof and/or water-resistant camera to which the present invention is applied, according to the eighth embodiment of the present invention;

FIG. 18 is a cross-sectional view of a significant portion of a waterproof and/or water-resistant camera to which the present invention is applied, according to the ninth embodiment of the present invention;

FIG. 19 is a cross-sectional view of a significant portion of a waterproof and/or water-resistant camera to which the present invention is applied, according to the tenth embodiment of the present invention;

FIG. 20 is a cross-sectional view of a significant portion of a waterproof and/or water-resistant camera to which the present invention is applied, according to the eleventh embodiment of the present invention;

FIG. 21 is a cross-sectional view of a significant portion of a waterproof and/or water-resistant camera to which the present invention is applied, according to the twelfth embodiment of the present invention;

FIG. 22 is a cross-sectional view of a significant portion of a waterproof and/or water-resistant camera to which the present invention is applied, according to the thirteenth embodiment of the present invention;

DESCRIPTION OF THE PREFERRED EMBODIMENT

Figure 7:
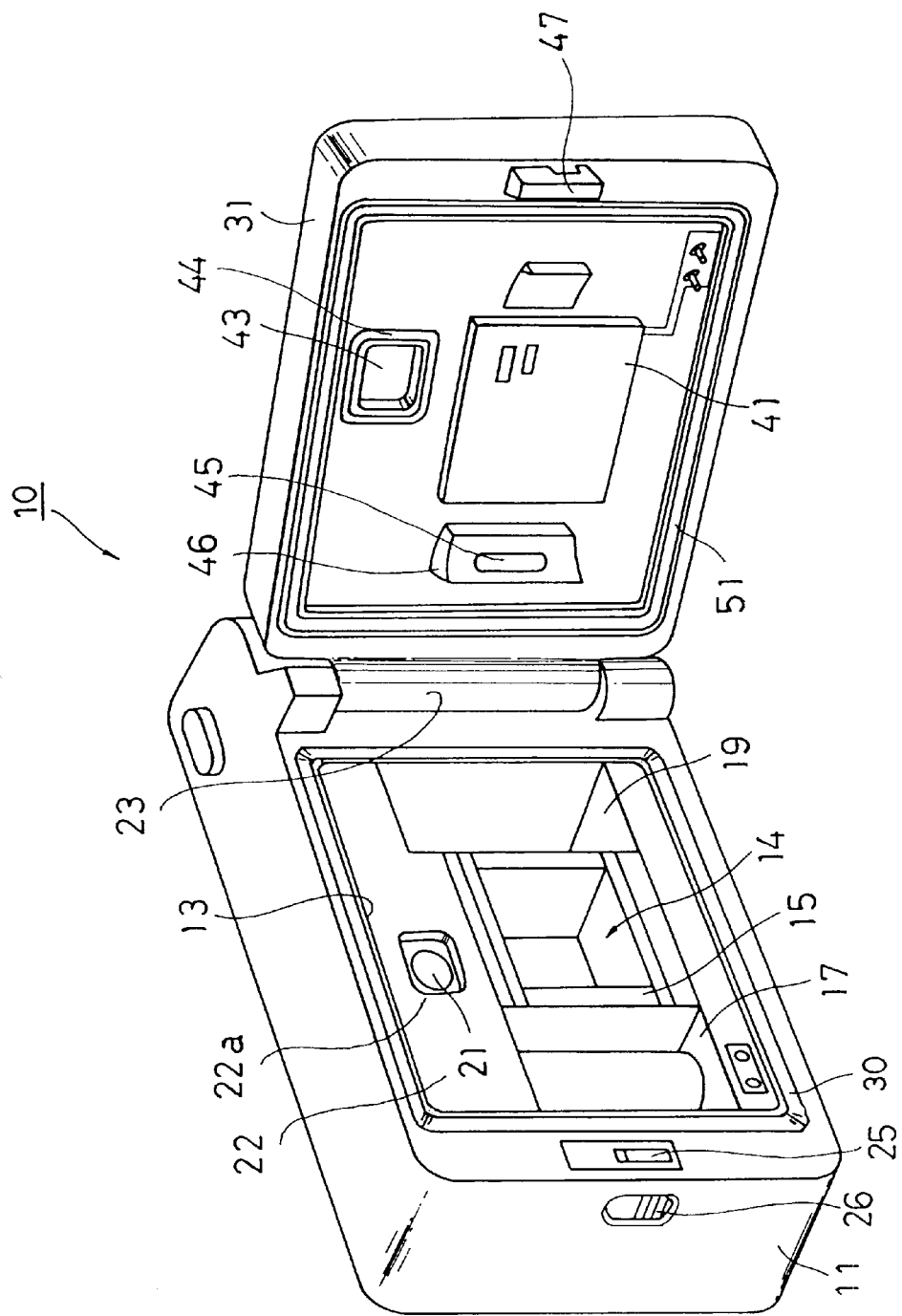
FIG. 7 is a perspective view of a waterproof and/or water-resistant camera, with its back cover opened, to which the present invention is applied, according to the first embodiment of the present invention.

FIG. 7 shows a waterproof and/or water-resistant camera 10, with its back cover 31 opened, to which the present invention is applied. The camera 10 includes a camera body 11 constituted in a watertight fashion and an openable back cover 31 pivotably connected to the camera body 11 along one side of the back of the camera body 11 for opening and closing a rectangular-shaped opening 13 formed on the back of the camera body 11.

The camera body 11 is provided, in the opening 13, with a rectangular-shaped aperture frame 15 which defines a photographing aperture 14, a film compartment 19 on the right side of the photographing aperture 14, and a spool compartment 17 on the left side of the photographing aperture 14. The camera body 11 is also provided in the opening 13 above the photographing aperture 14 with a viewfinder eyepiece 21. The aperture frame 15, the film compartment 19, the spool compartment 17 and the eyepiece 21 are all placed within the interior of the opening 13.

The back cover 31 is pivoted by a hinge 23 provided along one side of the back of the camera body 11 for pivotally opening and closing the opening 13. The back cover 31 is provided with a pressure plate 41, a watertight finder window 43 and a watertight film information window 45. The finder window 43 is formed at a position corresponding to that of the viewfinder eyepiece 21 when the back cover 31 is closed. Through the film information window 45 the photographer can see the film information printed on a film patrone (not shown) inserted into the film compartment 17 when the back cover 31 is closed. The back cover 31 is further provided on the inner surface thereof with light-impermeable members 44 and 46 which surround the finder window 43 and the film information window 45, respectively. The light-impermeable members 44 and 46 come into contact with a contacting surface 22a, surrounding the viewfinder eyepiece 21, of an inner wall 22 of the camera body 11, and the surface of a patrone (not shown) when the back cover 31 is closed, respectively, so that light may not enter the camera body through the windows 43 and 45.

The back cover 31 is provided with a sealing member 51 which surrounds the opening 13 when the back cover 31 is closed. The sealing member 51 is made of an elastic and light-impermeable material such as black-colored rubber. The sealing member 51 comes into pressing contact with a contacting surface 30 formed within the back of the camera body 11 around the opening 13 when the back cover 31 is closed so as to establish a watertight connection between the camera body 11 and the back cover 31.

An engaging member 25 is formed within the camera body 11 and an engaging member 47 is formed on the back cover 31. The engaging members 25 and 47 are engaged with each other when the back cover 31 is closed. The engagement of the members 25 and 47 is set/released by manually sliding a back cover opening latch 26 to open/close the back cover 31.

Figure 1:
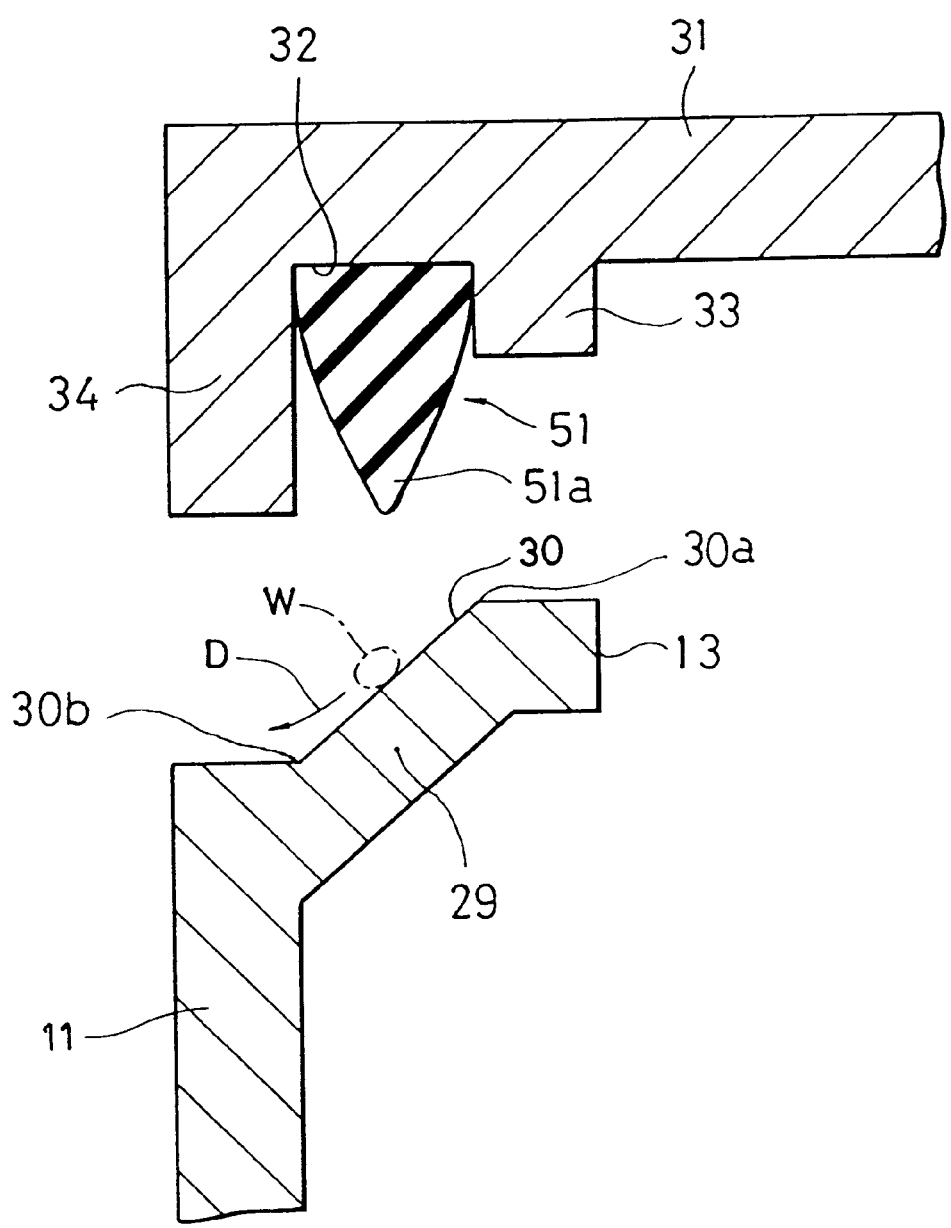
FIG. 1 is a cross-sectional view of a significant portion of a waterproof and/or water-resistant camera, with its back cover opened, to which the present invention is applied, according to the first embodiment of the present invention.
Figure 2:
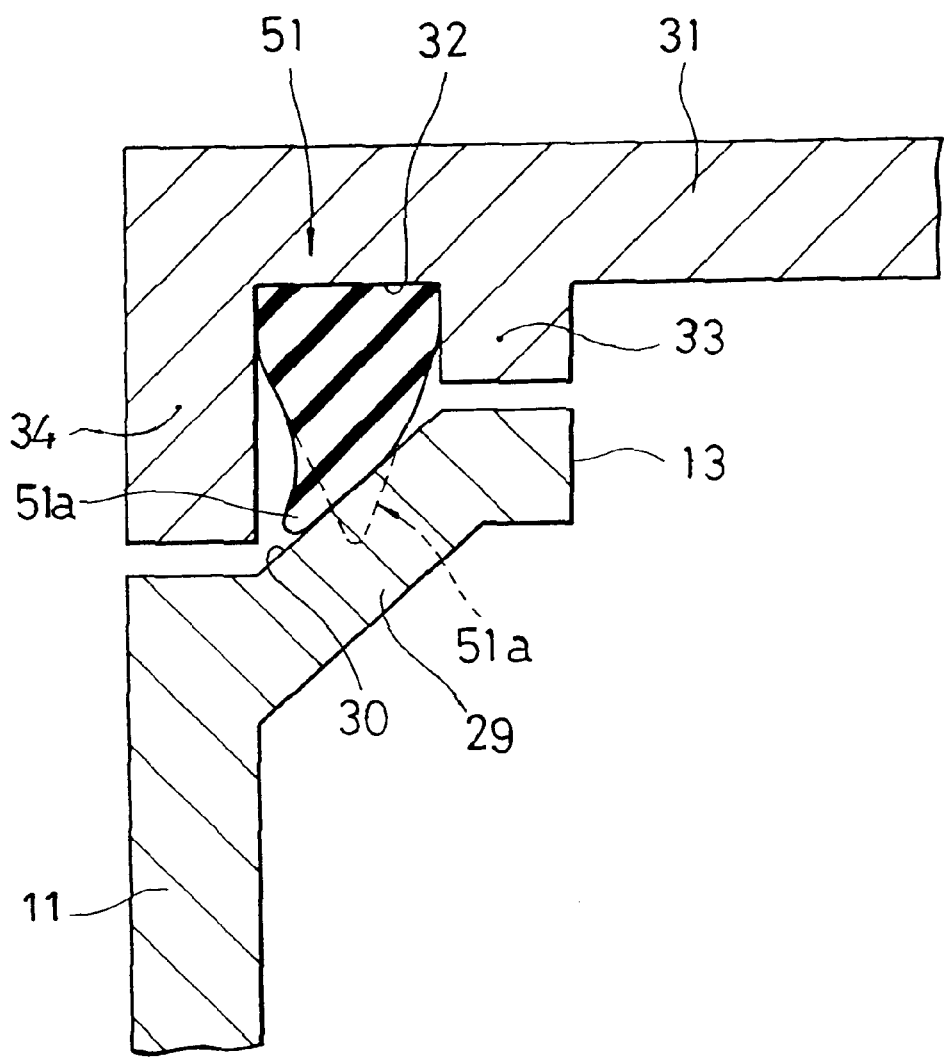
FIG. 2 is a cross-sectional view of the significant portion of the waterproof and/or water-resistant camera of FIG. 1, with its back cover closed.

FIGS. 1 and 2 show a first embodiment of the present invention. The top and bottom portions of these figures correspond to the rear and front of the camera 10, respectively. An inwardly projecting flange 29 is integrally formed with the camera body 11. An outer surface of the flange 29 forms the contacting surface 30. The edge of the flange 29 defines the opening 13. As can be seen from the figures, the contacting surface 30 is formed in such a manner so as to taper towards the rear of the camera 10, i.e., towards the back cover 31 in a cross section. In other words, the contacting surface 30 is formed in such a manner to be a tapered surface so that the inner end 30a of the contacting surface 30 is closer to the back cover 31 than the outer end 30b of the contacting surface 30.

The back cover 31 is provided on its inner surface with an inner circumferential projection 33 and an outer circumferential projection 34 which are formed parallel to each other. A circumferential groove 32 is formed on the back cover 31 between the inner and outer circumferential projections 33 and 34, and the sealing member 51 is fixed to the groove 32, e.g. by means of a watertight adhesive, with the fixed base portion of the sealing member 51 held between the inner and outer circumferential projections 33 and 34. The outer circumferential projection 34 is longer than the inner circumferential projection 33 in a direction perpendicular to the back cover 31.

The sealing member 51 is formed to taper away from the back cover 31 in cross section. The tip 51a of the sealing member 51 comes into pressing contact with the contacting surface 30.

According to the waterproof and/or water-resistant camera of the first embodiment of the present invention, the sealing member 51 comes into pressing contact with the contacting surface 30 of the camera body 11 when the back cover 31 is closed, thereby the watertight connection between the camera body 11 and the back cover 31 is established. In this state, since the tip 51a of the sealing member 51 presses against the contacting surface 30 tapering towards the back cover 31 in a cross section, the tip 51a of the sealing member 51 is curved along the contacting surface 30 towards the outside of the camera 10 (i.e., towards the left side as viewed in FIGS. 1 and 2). With this structure, in the state where the back cover 31 is closed, the biasing force of the sealing member 51 which is applied to the contacting surface 30 is diminished while maintaining the watertight connection between the camera body 11 and the back cover 31, as compared with a conventional case where a contacting surface corresponding to the contacting surface 30 is formed on a plane to which the pressing direction (the downward direction of FIG. 2) of the sealing member 51 is substantially perpendicular.

In general, a photographer usually opens the back cover of a camera with the back of the camera facing upwardly, i.e., the front of the camera facing downwardly. For this reason, according to the camera 10 to which the present invention is applied, when the back cover 31 is opened with the front of the camera facing downwardly, even if there are drops of water on the contacting surface 30, they run down the contacting surface 30 by gravitating towards the outside of the camera body 11 and thus do not fall into the camera body 11 through the opening 13. In FIG. 1, a drop of water W on the contacting surface 30 is indicated by a phantom line and the direction of the water drop W running down along the contacting surface 30 is indicated by an arrow D.

As can be seen from the foregoing, according to the waterproof and/or water-resistant camera 10 to which the present invention is applied, even if there are drops of water remaining on the contacting surface 30 when the back cover 31 is opened, the drops of water will not fall into the camera body 11 as long as the camera 10 is held with the front of the camera 10 facing downwardly.

Figure 3:
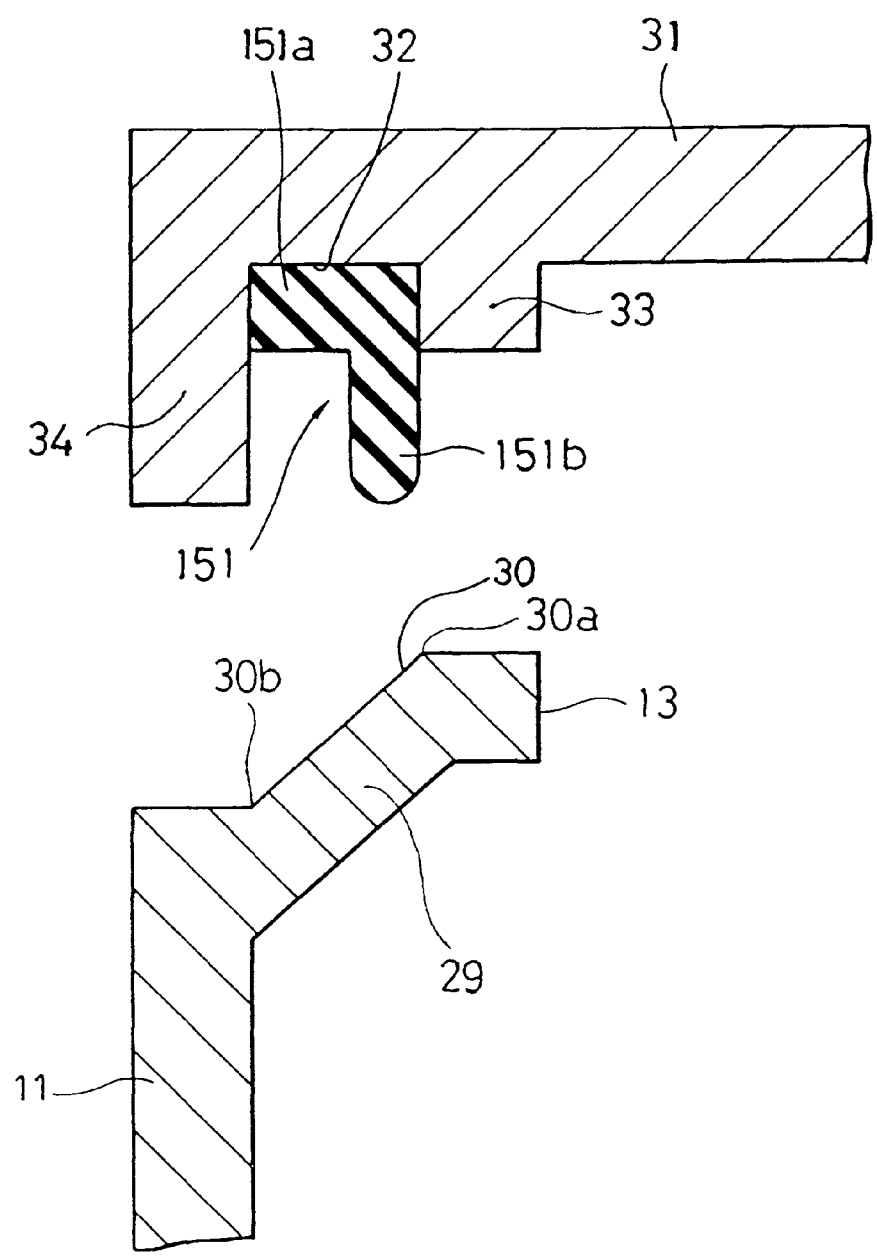
FIG. 3 is a cross-sectional view of a significant portion of a waterproof and/or water-resistant camera, with its back cover opened, to which the present invention is applied, according to the second embodiment of the present invention.
Figure 4:
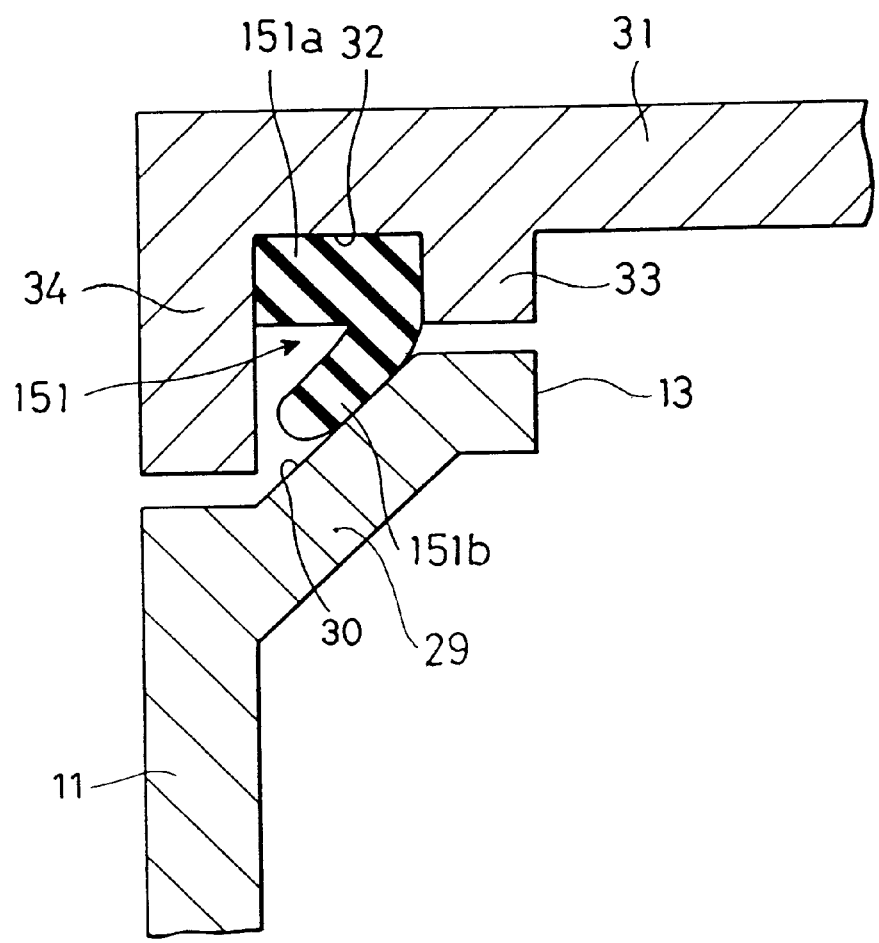
FIG. 4 is a cross-sectional view of the significant portion of the waterproof and/or water-resistant camera of FIG. 3, with its back cover closed.
Figure 5:
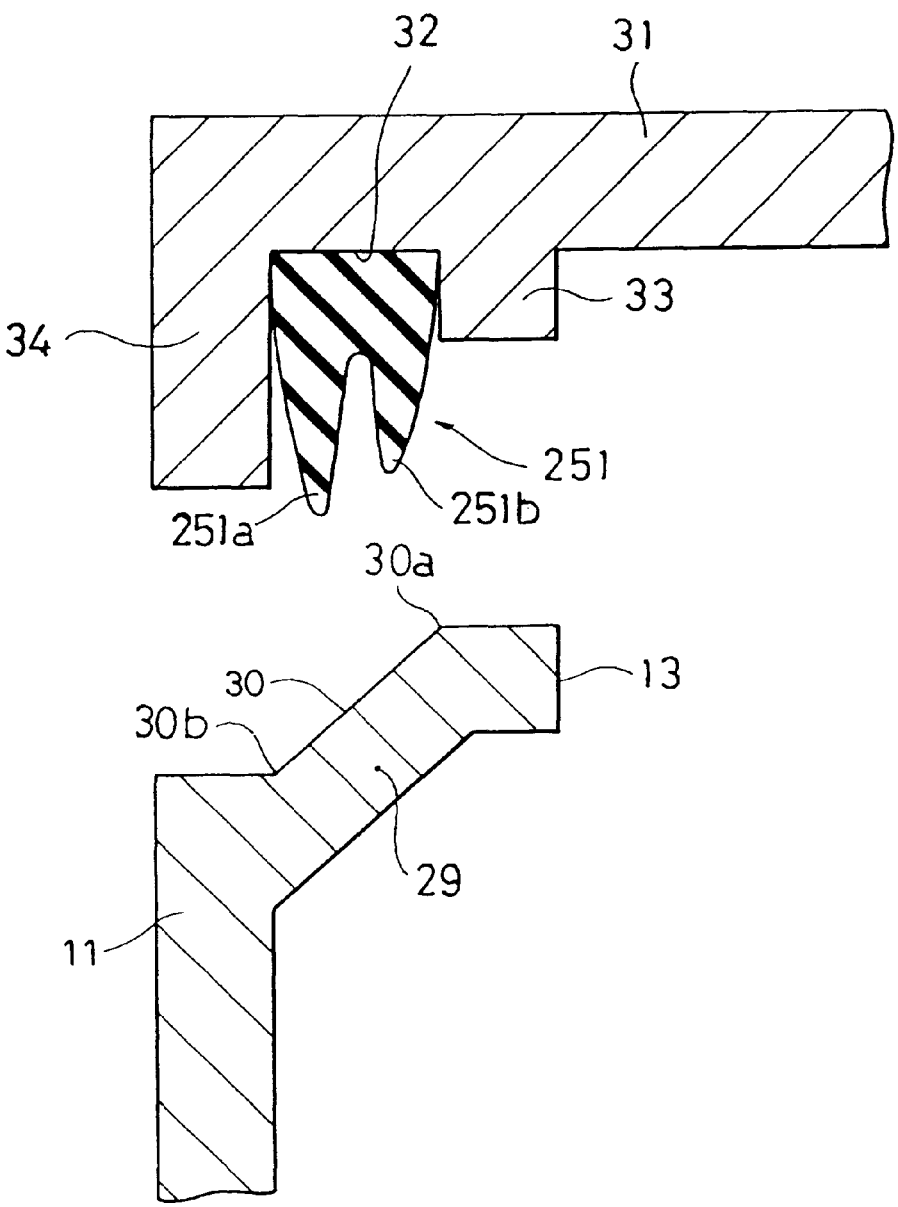
FIG. 5 is a cross-sectional view of a significant portion of a waterproof and/or water-resistant camera, with its back cover opened, to which the present invention is applied, according to the third embodiment of the present invention.
Figure 6:
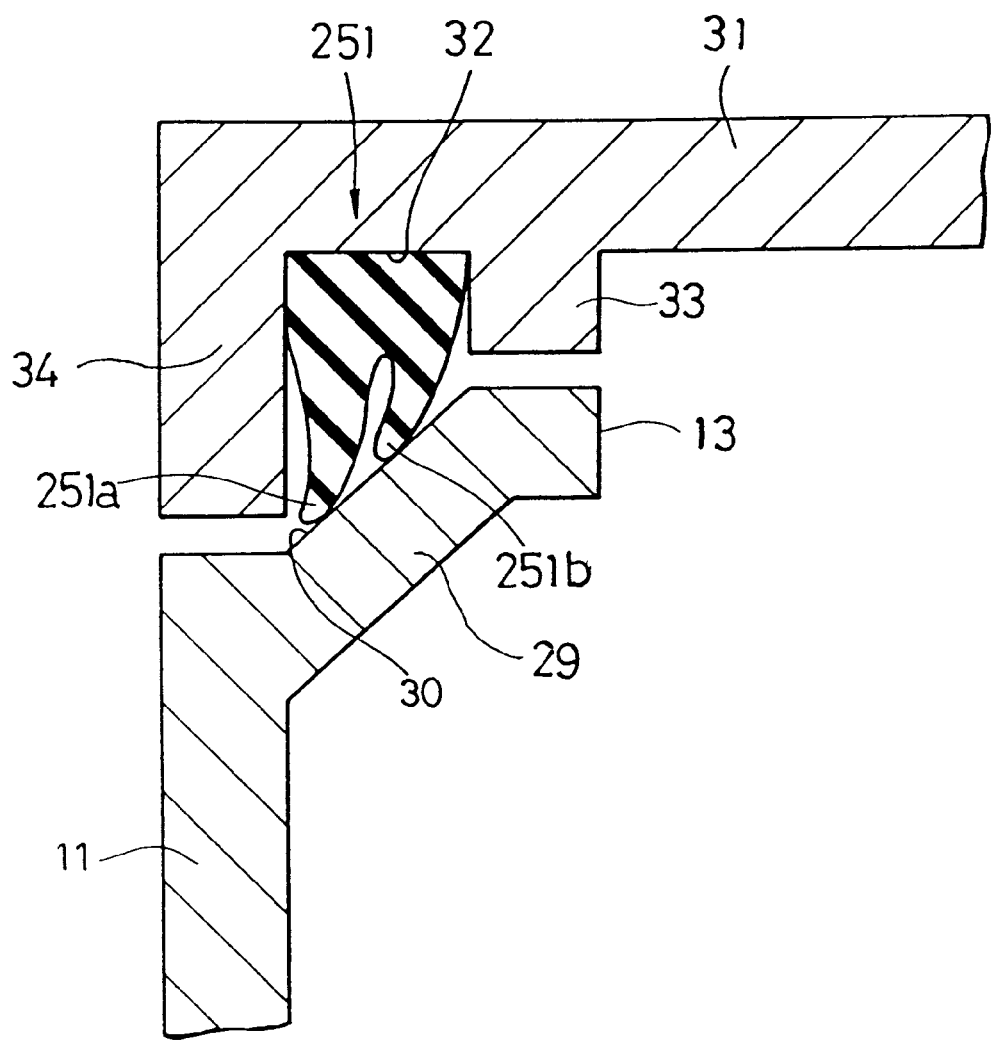
FIG. 6 is a cross-sectional view of the significant portion of the waterproof and/or water-resistant camera of FIG. 5, with its back cover closed.

FIGS. 3 and 4 show a second embodiment of the present invention and FIGS. 5 and 6 show a third embodiment of the present invention. The second and third embodiments are the same as the first embodiment in structure except that sealing members 151 and 251 have different shapes from the sealing member 51 of the first embodiment.

In the second embodiment shown in FIGS. 3 and 4, the sealing member 151, of the first embodiment, which corresponds to the sealing member 51, has an "L"-shaped cross section and consists of a base portion 151a fixed to the groove 32 and a lip 151b projecting from the inner edge of the base portion 151a perpendicularly thereto. The lip 151b comes into pressing contact with the contacting portion 30 when the back cover 31 is closed as shown in FIG. 4. In this state, the lip 151b is curved along the contacting surface 30 towards the outside of the camera 10. Therefore, with the camera 10 constructed according to the second embodiment, the same effect as that of the first embodiment can also be obtained.

In the third embodiment shown in FIGS. 5 and 6, the sealing member 251, which corresponds to the sealing member 51 of the first embodiment, has an outer lip 251a and an inner lip 251b both of which come into contact with the contacting surface 30 when the back cover 31 is closed. The outer lip 251a is formed to be slightly longer than the inner lip 251b in the forward and rearward directions, i.e., the vertical direction of FIG. 5. Each of the outer and inner lips 251a and 251b tapers away from the back cover 31 in a cross section.

In the state where the back cover 31 is closed, as shown in FIG. 6, both the outer and inner lips 251a and 251b are curved along the contacting surface 30 towards the outside of the camera 10. Therefore, with the camera 10 constructed according to the third embodiment, the same effect as that of the first embodiment can also be obtained. Furthermore, according to the third embodiment, in the state where the back cover 31 is closed, even if some drops of water should penetrate towards the inside of the camera 10 between the contacting surface 30 and the outer lip 251a, the drops of water will be prevented from further entering the camera 10 by the inner lip 251b, and thus, a more reliable watertight connection between the camera body 11 and the back cover 31 is achieved.

The shape of the sealing member which comes into pressing contact with the contacting surface 30 when the back cover 31 is closed is not limited to the shapes of the sealing members 51, 151 and 251 of the above embodiments, but may be any other shape as long as the sealing member comes into pressing contact with the contacting surface 30 when the back cover 31 is closed.

Figure 8:
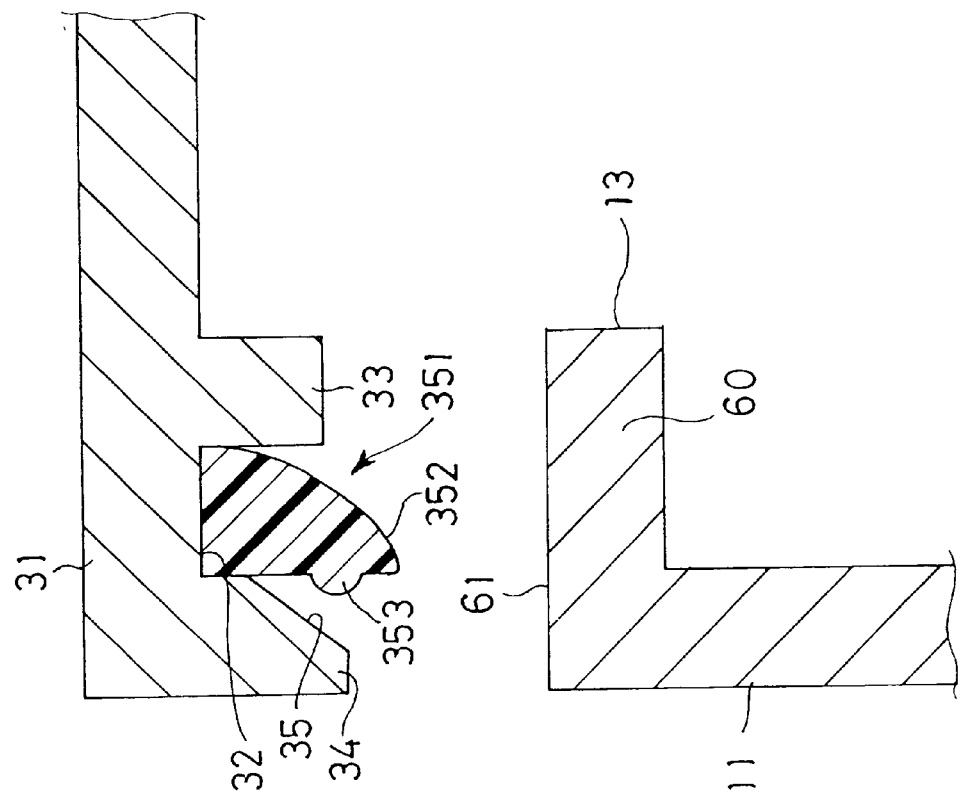
FIG. 8 is a cross-sectional view of a significant portion of a waterproof and/or water-resistant camera, with its back cover opened, to which the present invention is applied, according to the fourth embodiment of the present invention.
Figure 9:
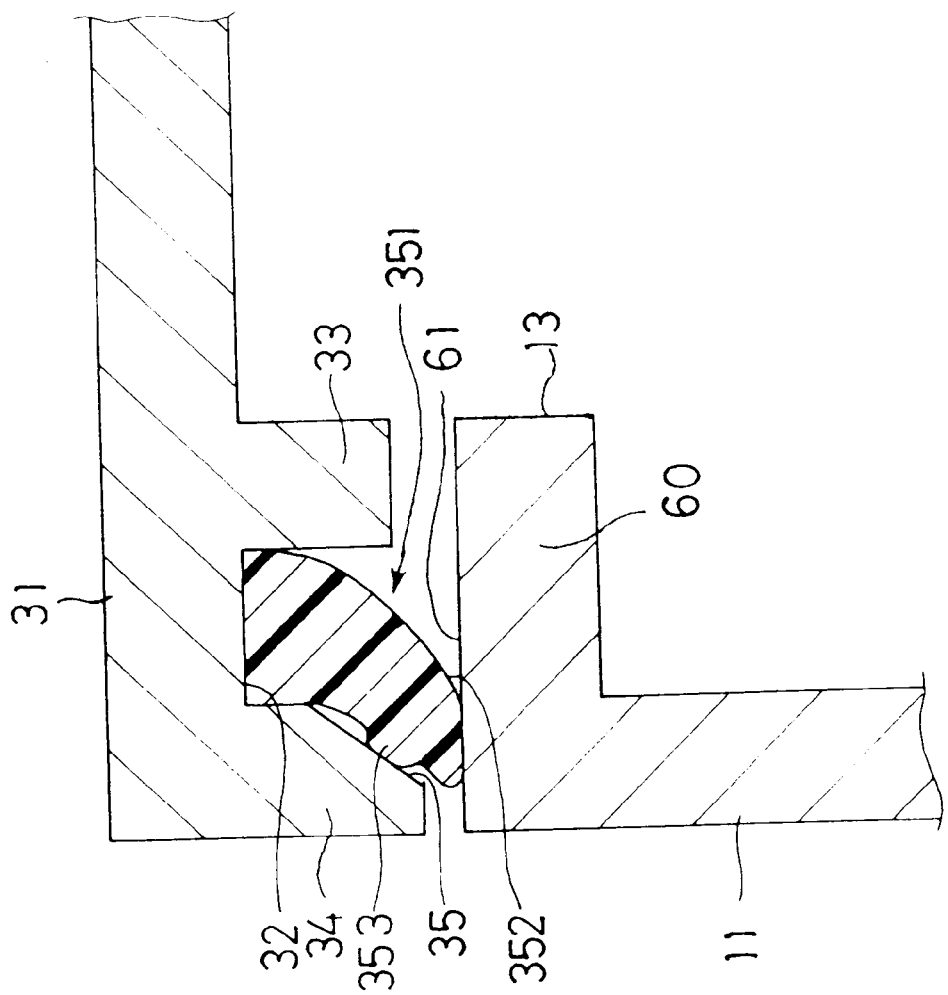
FIG. 9 is a cross-sectional view of the significant portion of the waterproof and/or water-resistant camera of FIG. 8, with its back cover closed.
Figure 13:
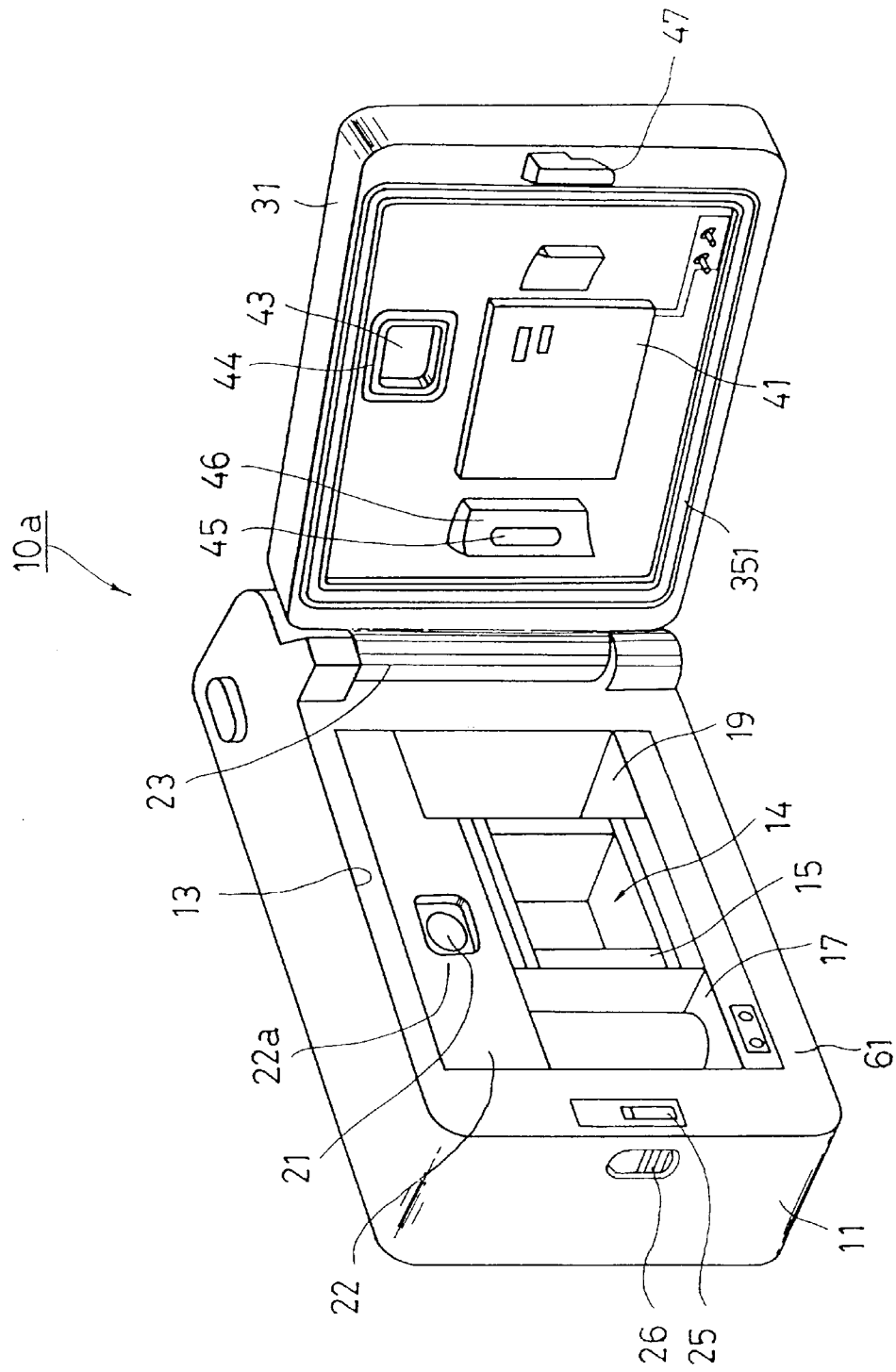
FIG. 13 is a perspective view of a waterproof and/or water-resistant camera, with its back cover opened, to which the present invention is applied, according to the fourth embodiment of the present invention.

FIGS. 8 and 9 show a fourth embodiment of the present invention. The fourth embodiment is substantially the same as the above-noted embodiments in structure except that the shape of the sealing member 351 is different from the sealing members of the above embodiments and a contacting surface 61 is formed in a different manner from the contacting surface 30 of the above embodiments. FIG. 13 shows a waterproof and/or water-resistant camera 10a, with its back cover 31 opened, to which the present invention is applied, according to the fourth embodiment of the present invention. In FIG. 13, all the members or parts which are substantially the same as those in FIG. 7 are designated by like reference numerals.

In this embodiment, an inwardly projecting flange 60, extending in a direction perpendicular to the forward and rearward directions of the camera 10a, is integrally formed with the camera body 11. The outer surface of the flange 60 forms the contacting surface 61. The edge of the flange 60 defines the opening 13. As can be seen from the figures, the contacting surface 61 is formed on a plane substantially perpendicular to the forward and rearward directions of the camera 10a (i.e., the vertical direction of FIG. 8).

The sealing member 351, having a characteristic shape, is fixed to the groove 32, e.g. by means of a watertight adhesive, with the fixed base portion of the sealing member 351 held between the inner and outer circumferential projections 33 and 34. The outer circumferential projection 34 includes an inclined surface (i.e., pressure portion) 35 which inclines outwardly and away from the sealing member 351.

The sealing member 351 has an inclined or curved surface 352 which inclines outwardly, similarly to the inclined surface 35 of the outer circumferential projection 34. The sealing member 351 also has a raised portion (i.e., auxiliary elastic portion) 353 on the outer surface of the sealing member 351 which is adjacent to the inclined surface 35. Although the inclined surface 352 and the raised portion 353 are formed entirely along the sealing member 351, the raised portion 353 may be formed intermittently along the sealing member 351.

FIG. 9 shows the state where the back cover 31 is closed, thereby the sealing member 351 is brought into pressing contact with the contacting surface 61. When the back cover 31 is closed, the inclined surface 352 of the sealing member 351 comes into pressing contact with the contacting surface 61 and slides thereon while the sealing member 51 is elastically being deformed outwardly due to the outward inclination of the inclined surface 352. Secondly, after the sealing member 351 is deformed, the raised portion 353 comes into pressing contact with the inclined surface 35, and thus, the inclined surface 35 presses the sealing member 351 to the contacting surface 61 through the raised portion 353.

As can be seen from the above-noted structure, it can be understood that the sealing member 351 is brought into pressing contact with the contacting surface 61 not only by the biasing force of the sealing member 351 itself, but also the biasing force of the inclined surface 35 through the raised portion 353, thus resulting in a more reliable watertight connection between the camera body 11 and the back cover 31. In addition, even if the biasing force of the sealing member 351 diminishes due to the aging of the sealing member 351 and/or the slight deformation of the back cover 31 by the biasing force of the sealing member 351 to slightly change the positional relationship between the contacting surface 61 and the sealing member 351, the watertight connection between the contacting surface 61 and the inclined surface 352 will be sufficiently maintained since the inclined surface 35 presses against the raised portion 353 to thereby bring the sealing member 351 into pressing contact with the contacting surface 61.

Figure 10:
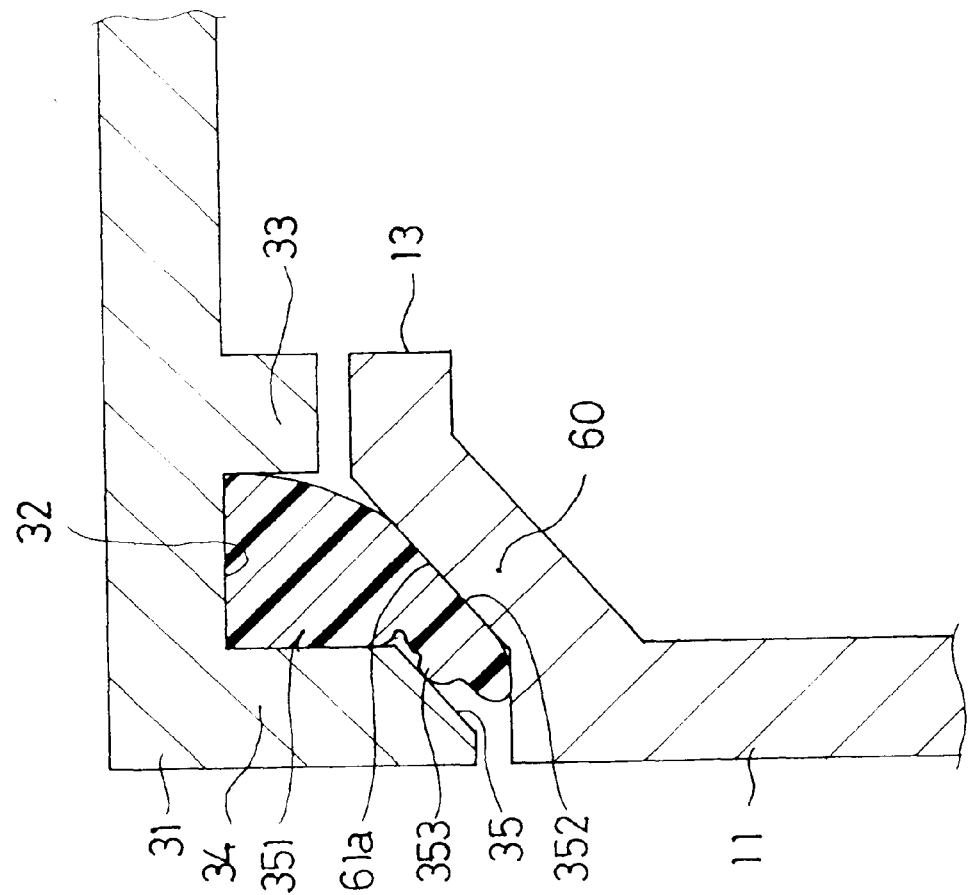
FIG. 10 is a cross-sectional view of a significant portion of a waterproof and/or water-resistant camera, with its back cover closed, to which the present invention is applied, according to the fifth embodiment of the present invention.

FIG. 10 shows a fifth embodiment of the present invention. The fifth embodiment is substantially the same as the fourth embodiment in structure except for the shape of the inwardly projecting flange 60. The flange 60 of the fifth embodiment is formed in a similar manner to the projecting flange 29 of the first, second or third embodiment to have an inclined contacting surface 61a which is equivalent to the contacting surface 30 of the above embodiments. With the arrangement of the fifth embodiment, in addition to the effects of the fourth embodiment, even if there are drops of water remaining on the contacting surface 61a when the back cover 31 is opened, the drops of water will not fall into the camera body 11 as long as the camera 10 is held with the front of the camera 10 facing downwardly as previously explained.

Figure 11:
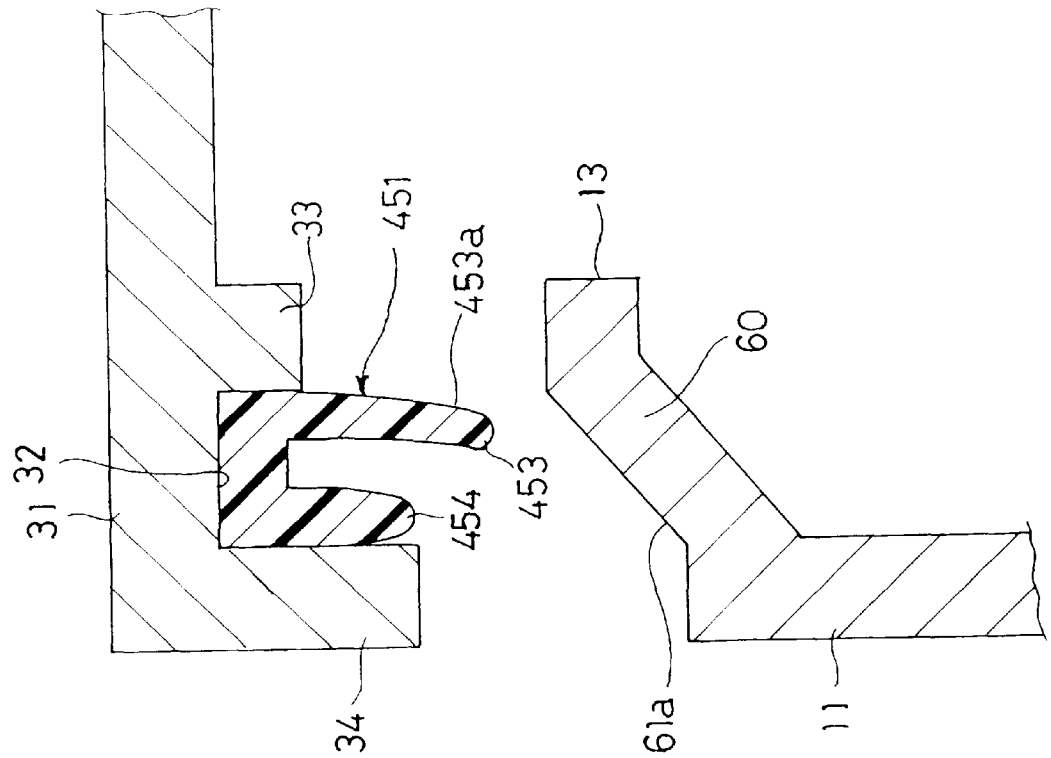
FIG. 11 is a cross-sectional view of a significant portion of a waterproof and/or water-resistant camera, with its back cover opened, to which the present invention is applied, according to the sixth embodiment of the present invention.
Figure 12:
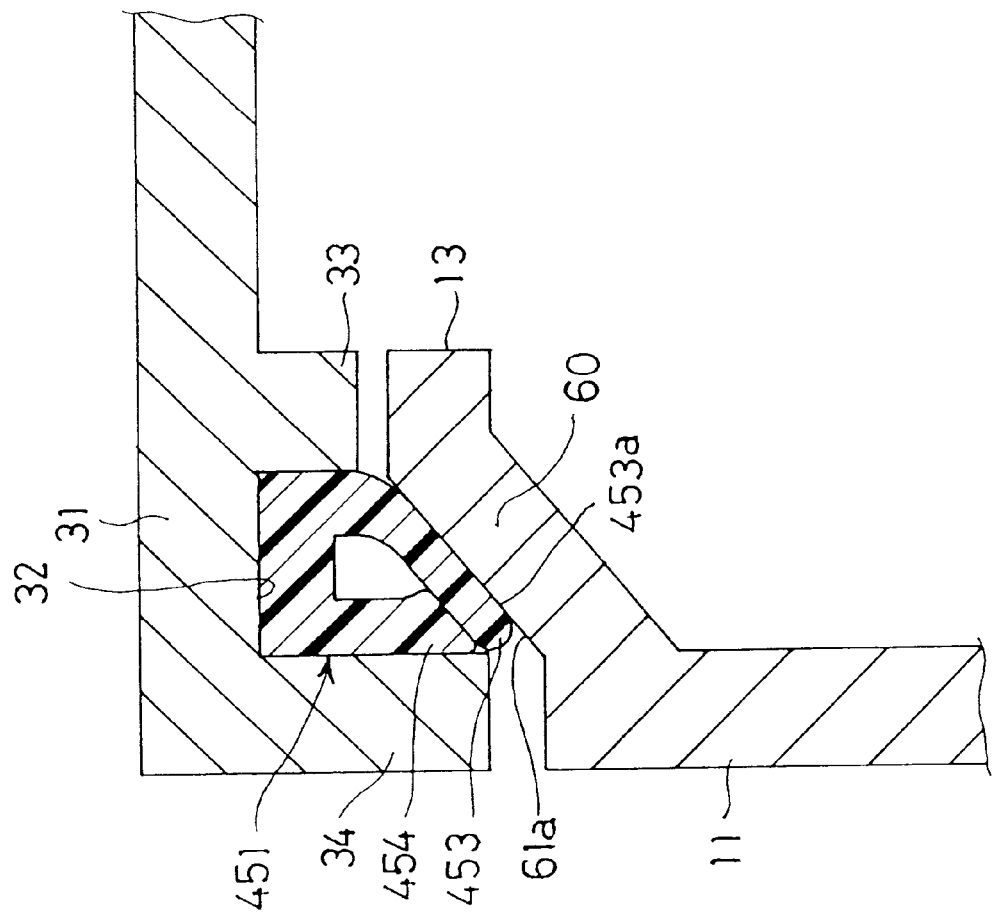
FIG. 12 is a cross-sectional view of the significant portion of the waterproof and/or water-resistant camera of FIG. 11, with its back cover closed.

FIGS. 11 and 12 show a sixth embodiment of the present invention. The sixth embodiment is substantially the same as the fourth embodiment in structure except that the shapes of the sealing member 451 and the inwardly projecting flange 60 are different from those of the fourth embodiment. The projecting flange 60 in the sixth embodiment is equivalent to that in the fifth embodiment. In addition, an inclined surface equivalent to the inclined surface 35 of the fourth or fifth embodiment is not formed on the outer circumferential projection 34 in the sixth embodiment.

The sealing member 451, which corresponds to the sealing member 351, has an inner tongue 453 and an outer tongue 454 which are formed substantially parallel to each other in a free state thereof and extend in a direction away from the groove 32. The inner tongue 453 is formed to be longer than the outer tongue 454 in the forward and rearward directions, i.e., the vertical direction of FIG. 11. The inner surface 453a of the inner tongue 453 comes into pressing contact with the contacting surface 61a when the back cover 31 is closed.

FIG. 12 shows the state where the back cover 31 is closed, thereby the sealing member 451 is brought into pressing contact with the contacting surface 61a. When the back cover 31 is closed, the inner surface 453a of the sealing member 451 comes into pressing contact with the contacting surface 61a and slides thereon while the inner tongue 453 is elastically deformed outwardly due to the inclination of the contacting surface 61a. Secondly, after the inner tongue 453 is deformed, the tip of the outer tongue 454 (i.e., auxiliary elastic portion) comes into contact with the tip of the inner tongue 453, and finally, the tip of the outer tongue 454 is compressed by the tip of the inner tongue 453 and the outer circumferential projection (i.e., pressure portion) 34 therebetween. Consequently, the outer circumferential projection 34 presses against the inner tongue 453 to the contacting surface 61a through the tip of the outer tongue 454.

According to the above arrangement of the sixth embodiment, since the biasing force of the outer tongue 454 is added to the biasing force of the inner tongue 453 applied to the contacting surface 60a, the watertight connection between the camera body 11 and the back cover 31 becomes stronger, as compared with the case where only the inner tongue 453 comes into pressing contact with the contacting surface 60a. In addition, even if the biasing force of the inner tongue 453 diminishes due to aging of the inner tongue 453 and/or the slight deformation of the back cover 31 by the biasing force of the sealing member 451 to slightly change the positional relationship between the contacting surface 61a and the sealing member 451, the watertight connection between the contacting surface 61a and the inner surface 453a of the inner tongue 453 will be sufficiently maintained since the outer circumferential projection 34 presses the inner tongue 453 to the contacting surface 61a through the outer tongue 454. Although the sealing member 451 is provided with two tongues, i.e., the inner and outer tongues 453 and 454 in this embodiment, the sealing member 451 may be provided with more than two tongues in such a manner that adjacent tongues come into pressing contact with each other when the back cover 31 is closed.

The shape of the sealing member coming into pressing contact with the contacting surface 61a when the back cover 31 is closed is not limited to the shapes of the sealing members 351 and 451 of the above embodiments but may be any other shape as long as the sealing member comes into pressing contact with the contacting surface 61a by its self-biasing force and the pressure portion of the back cover 31 further presses against the sealing member to the contacting surface 61a through the auxiliary elastic portion of the sealing member when the back cover 31 is closed.

Figure 16:
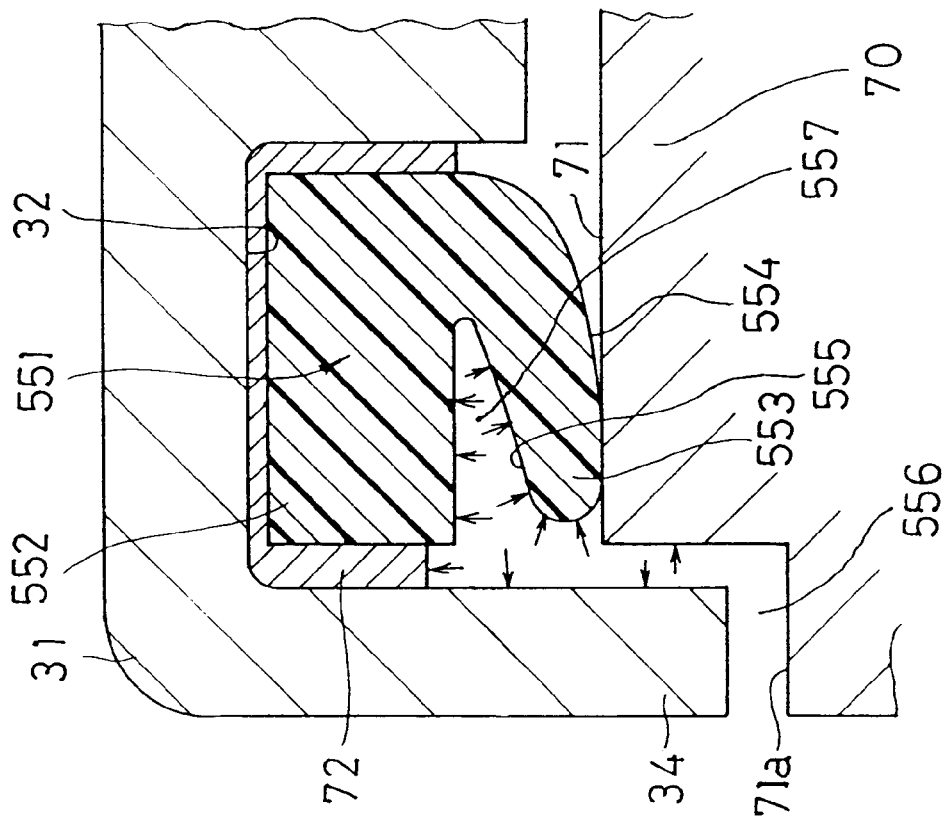
FIG. 16 is an enlarged cross sectional view of the significant portion of the waterproof and/or water-resistant camera of FIG. 15, illustrating the action of the hydraulic pressure on the sealing member.
Figure 23:
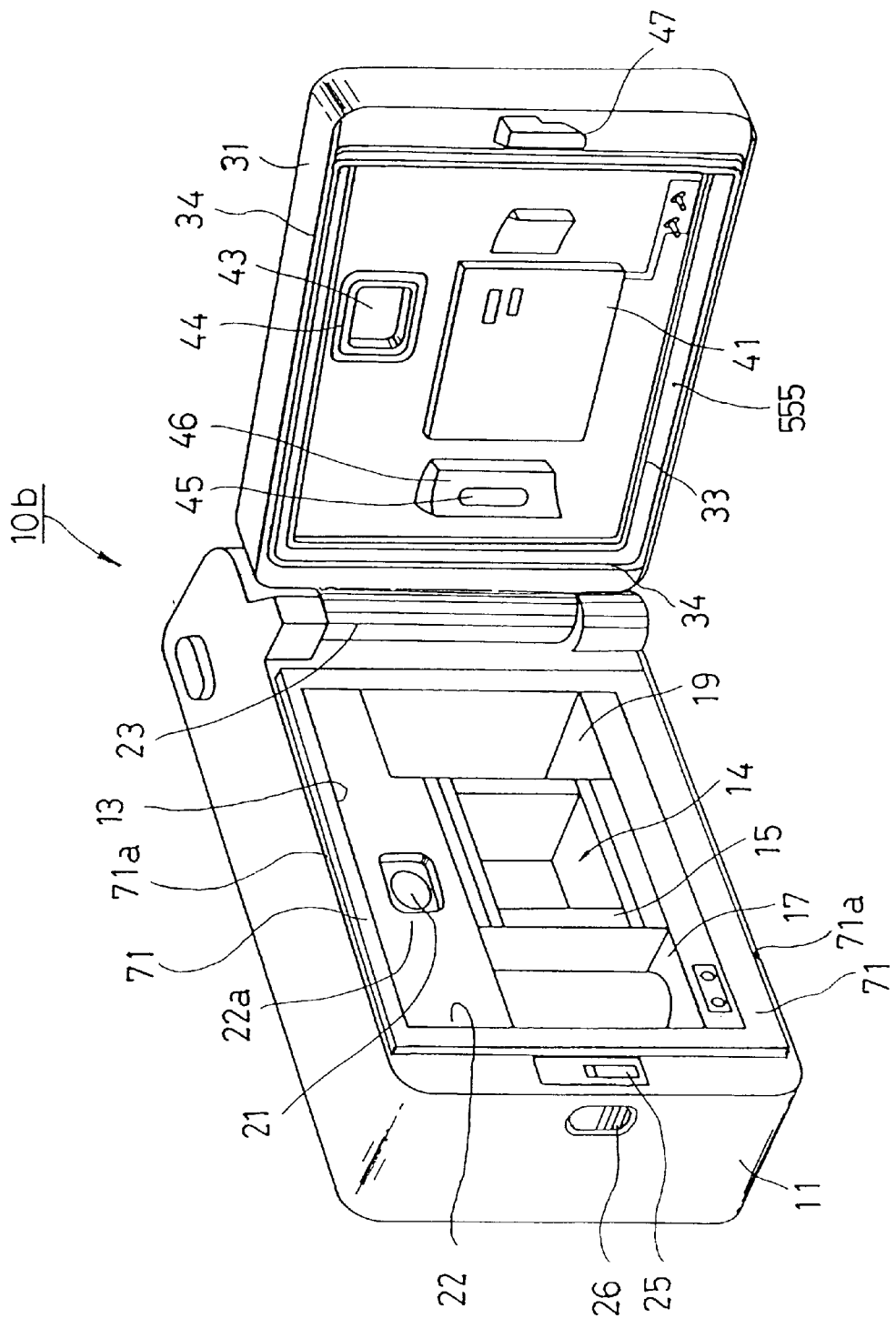
FIG. 23 is a perspective view of a waterproof and/or water-resistant camera, with its back cover opened, to which the present invention is applied, according to the seventh embodiment of the present invention.

FIGS. 14, 15 and 16 show a seventh embodiment of the present invention. The seventh embodiment is substantially the same as the sixth embodiment in structure except that the shape of the sealing member 551 is different from the sealing member 451 and the shape of the inwardly projecting flange 70 is different from the inwardly projecting flange 60. FIG. 23 shows a waterproof and/or water-resistant camera 10b, with its back cover 31 opened, to which the present invention is applied, according to the seventh embodiment of the present invention. In FIG. 23, all the members or parts which are substantially the same as those in FIGS. 7 or 13 are designated with like reference numerals.

The sealing member 551 includes a base portion 552 adhered to the groove 32 by an adhesive 72, and a tongue 553 integrally formed with the inner edge of the base portion 552 and extending in a direction away from the groove 32. The tongue 553 slightly curves outwardly (i.e., toward the outer circumferential projection 34) to thereby make the inner surface 554 of the tongue 553 convex. Thus, as shown in FIG. 14, the sealing member 551 has a "J"-shaped cross section when in a free state.

The inwardly projecting flange 70 is integrally formed with the camera body 11 in such a manner so as to have a contacting surface 71 perpendicular to the forward and rearward directions of the camera body 11 and a recessed portion 71a recessed toward the front of the camera body 11. The contacting surface 71 is similar to the contacting surface 61 of the fourth embodiment. The recessed portion 71a is formed in such a manner that the recessed portion 71a receives the tip of the outer circumferential projection 34 when the back cover 31 is closed and that a space 556 is formed between the recessed portion 71a and the outer circumferential projection 34 when the back cover 31 is closed. The space 556 is formed in a minimal size to thereby allow water to enter the space 556.

FIG. 15 shows the state where the back cover 31 is closed, thereby the sealing member 551 is brought into pressing contact with the contacting surface 71. When the back cover 31 is closed, the inner surface 554 of the tongue 553 comes into pressing contact with the contacting surface 71 while the tongue 553 is elastically deformed outwardly due to the outward curving of the tongue 553.

In the state where the back cover 31 is closed, as shown in FIGS. 15 and 16, a recess 557 formed between the tongue 553 and the base portion 552, the recess 557 is being connected with the space 556. When the camera 10b is used in water, water enters the space 556 and reaches the recess 557 and hydraulic pressure of the water is applied to the outer surface 555 of the tongue 553 in a direction perpendicular to the outer surface 555. The hydraulic pressure thus presses the tongue 553 against the contacting surface 71, and thus a stronger watertight connection between the camera body 11 and the back cover 31 is achieved in water. In addition, even if the biasing force of the sealing member 551 diminishes due to aging of the sealing member 551 and/or the slight deformation of the back cover 31 by the biasing force of the sealing member 551 to slightly change the positional relationship between the contacting surface 71 and the sealing member 551, the watertight connection between the contacting surface 71 and the inner surface 554 will be sufficiently maintained in water since the hydraulic pressure is applied to the outer surface 555 of the tongue 553 to thereby bring the inner surface of the tongue 553 firmly into pressing contact with the contacting surface 71.

FIG. 17 shows an eighth embodiment of the present invention. The eighth embodiment is the same as the seventh embodiment in structure except that the shape of the sealing member 651 is different from the sealing member 551. The phantom lines in FIG. 17 show the state where the back cover 31 is closed. The sealing member 651 includes a base portion 652 adhered to the groove 32 by the adhesive 72, and a tongue 653 which is integrally formed with the base portion 652 and curved outwardly. The tongue 653 and the base portion 652 together form a "u"-shaped cross section and a recess 657.

In the state where the back cover 31 is closed, as shown by the phantom lines in FIG. 17, the inner surface 654 of the tongue 653 comes into pressing contact with the contacting surface 71 while the recess 657 is connected with the space 656. When the camera 10b is used in water, water enters the space 656 and reaches the recess 657 and a hydraulic pressure of the water is applied to the outer surface 655 of the tongue 653. With the structure of the eighth embodiment, the same effects as those of the seventh embodiment can also be obtained.

FIGS. 18 shows a ninth embodiment of the present invention. The ninth embodiment is the same as the seventh and eighth embodiments in structure except that the shape of the sealing member 751 is different from the sealing members 551 and 651.

The phantom lines in FIG. 18 show the state where the back cover 31 is closed. The sealing member 751 includes a base portion 752 adhered to the groove 32 by the adhesive 72, and a tongue 753 which is integrally formed with the base portion 752 and curved outwardly. The tongue 753 is tapered in a cross section, and the inner surface 754 of the tongue 753 is a convex surface which comes into pressing contact with the contacting surface 71 when the back cover 31 is closed.

In the state where the back cover 31 is closed, as shown by the phantom lines in FIG. 18, the inner surface 754 of the tongue 753 comes into pressing contact with the contacting surface 71 while a recess 757 is connected with a space 756. When the camera 10b is used in water, water enters the space 756 and reaches the recess 757 and the hydraulic pressure of the water is applied to the outer surface 755 of the tongue 753. With the structure of the ninth embodiment, the same effects as those of the seventh and eighth embodiments can also be obtained.

FIGS. 19 shows a tenth embodiment of the present invention. The tenth embodiment is the same as the seventh, eighth, and ninth embodiments in structure, except that the shape of the sealing member 851 is different from the sealing members 551, 651, and 751.

The phantom lines in FIG. 19 show the state where the back cover 31 is closed. The sealing member 851 includes a base portion 852 adhered to the groove 32 by the adhesive 72, a tongue 853 which is integrally formed with the inner circumferential edge of the base portion 752 and curved outwardly, and a reinforcing wall 858 integrally formed with the outer circumferential edge of the base portion 852. The tongue 853 is tapered in a cross section, and the inner surface 854 of the tongue 853 is a convex surface which comes into pressing contact with the contacting surface 71 when the back cover 31 is closed.

In the state where the back cover 31 is closed, as shown by the phantom lines in FIG. 19, the inner surface 854 of the tongue 853 comes into pressing contact with the contacting surface 71 while a recess 857 is connected with a space 856. When the camera 10b is used in water, water enters the space 856 and reaches the recess 857 and hydraulic pressure of the water is applied to the outer surface 855 of the tongue 853. With the structure of the tenth embodiment, the same effects as those of the seventh through ninth embodiments can also be obtained.

FIGS. 20, 21, and 22 show eleventh, twelfth, and thirteenth embodiments of the present invention, respectively. The characteristics of these embodiments consist in the structure of the attachment of the sealing member to the groove 32 by the adhesive 72. In these embodiments, between the groove 32 and the bottom surface of the sealing member which is attached to the groove 32, there is provided a gap or space for receiving the adhesive 72 so that the adhesive may not egress from between the sealing member and the groove 32 during assembly.

FIG. 20 shows the eleventh embodiment of the present invention. The eleventh embodiment is the same as the seventh through tenth embodiments in structure except that the shape of the sealing member 951 is different from the sealing members 551, 651, 751, and 851 and that the sealing member 951 is provided with a groove 952a for receiving the adhesive 72.

The phantom lines in FIG. 20 show the state where the back cover 31 is closed. The sealing member 951 includes a base portion 952 adhered to the groove 32 by the adhesive 72, and a tongue 953 which is integrally formed with the base portion 952 and curved outwardly. The sealing member 951 is provided on its bottom surface with a groove 952a formed entirely along the bottom surface of the sealing member 951. The groove 952a is filled with the adhesive 72 and the sealing member 951 is then adhered to the groove 32. The tongue 953 and inner and outer surfaces 954 and 955 have the same functions as those in the seventh through tenth embodiments. With the structure of the eleventh embodiment, the same effects as those of the seventh through tenth embodiments can be obtained in addition to preventing the adhesive 72 from egressing between the sealing member 951 and the groove 32 during assembly.

FIG. 21 shows the twelfth embodiment of the present invention. The twelfth embodiment is substantially the same as the seventh embodiment in structure except that the bottom surface of the groove 32 is provided with projections 32a.

The phantom lines in FIG. 21 show the state where the back cover 31 is closed. A sealing member 1051 of this embodiment is similar to the sealing member 551 of the seventh embodiment. Therefore, portions of the sealing member 553 which are similar to those of the seventh embodiment are designated with like reference numerals. A gap is formed between the bottom surface of the sealing member 1051 and the bottom surface of the groove 32 with the projections 32a. The gap is filled with the adhesive 72. With the structure of the twelfth embodiment, the same effects as those of the seventh through tenth embodiments can be obtained in addition to preventing the adhesive 72 from egressing between the sealing member 1051 and the groove 32 during assembly.

FIG. 22 shows the thirteenth embodiment of the present invention. The thirteenth embodiment is the same as the seventh through twelfth embodiments in structure except that the shape of the sealing member 1151 is different from the sealing members 551 through 1051 and that an inwardly projecting flange 70' is different from the projecting flange 70.

The phantom lines in FIG. 22 show the state where the back cover 31 is closed. The sealing member 1151 includes a base portion 1152 adhered to the groove 32 by the adhesive 72, and a tongue 1153 which is integrally formed with the base portion 1152 and curved outwardly. The sealing member 1151 is provided on its bottom surface with grooves 1156 formed entirely along the bottom surface of the sealing member 1151. The sealing member 1151 is further provided with recesses 1157 and 1158 on the outer and inner edges of the base portion 1152, respectively. An excess of the adhesive 72 is received by the recesses 1157 and 1158 and the grooves 1156 so that the adhesive 72 may not egress from between the sealing member 1151 and the groove 32 during assembly.

The inwardly projecting flange 70' of the thirteenth embodiment is formed in a similar manner to the projecting flange 29 of the first, second or third embodiment to have an inclined contacting surface 74 which is equivalent to the contacting surface 30 of the above embodiments.

With the structure of the thirteenth embodiment, the same effects as those of the seventh through tenth embodiments can be obtained in addition to preventing the adhesive 72 from egressing between the sealing member 1151 and the groove 32 during assembly.

Grooves similar to the groove 952a of the eleventh embodiment, grooves similar to the grooves 1156 of the thirteenth embodiment, recesses similar to the recesses 1156 and 1157, and projections similar to the projections 32a may be provided in the any other embodiments, i.e., the first through tenth embodiments.

The shape of the sealing member is not limited to the shapes of the sealing members 551 through 1151 of the above seventh through thirteenth embodiments but may be any other shape as long as the sealing member comes into pressing contact with the contacting surface 71 or 72 by its self-biasing force when the back cover 31 is closed and the hydraulic pressure of the water presses the tongue against the contacting surface 71 or 72 when the camera 10b is used in water.

In the above fourth embodiment through thirteenth embodiments, the sealing member is provided on the back cover 31, and the contacting surface with which the sealing member comes into contact when the back cover 31 is closed is formed on the camera body 11. However, the sealing member and the contacting surface may be provided on the camera body 11 and the back cover 31, respectively.

Figure 24:
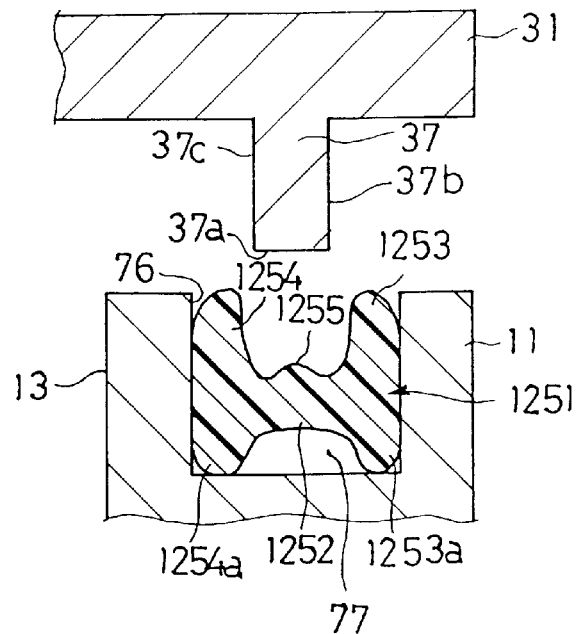
FIG. 24 is a cross-sectional view of a significant portion of a waterproof and/or water-resistant camera, with its back cover opened, to which the present invention is applied, according to the fourteenth embodiment of the present invention.
Figure 25:
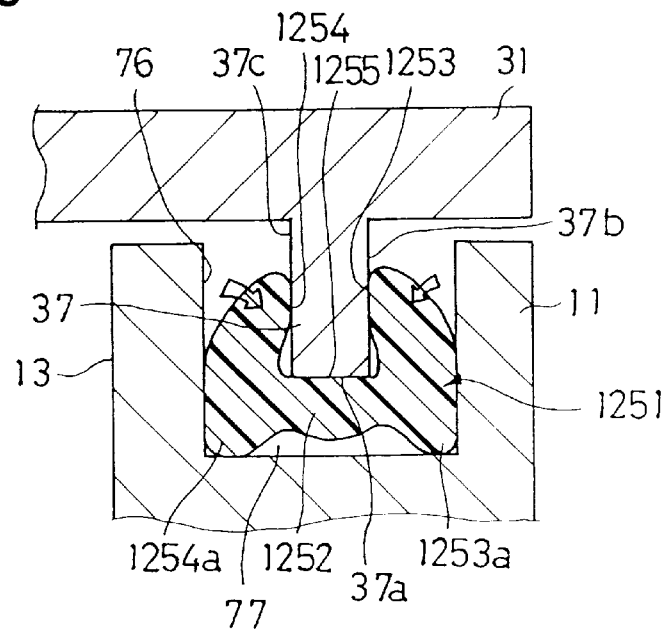
FIG. 25 is a cross-sectional view of the significant portion of the waterproof and/or water-resistant camera of FIG. 24, with its back cover closed.
Figure 28:
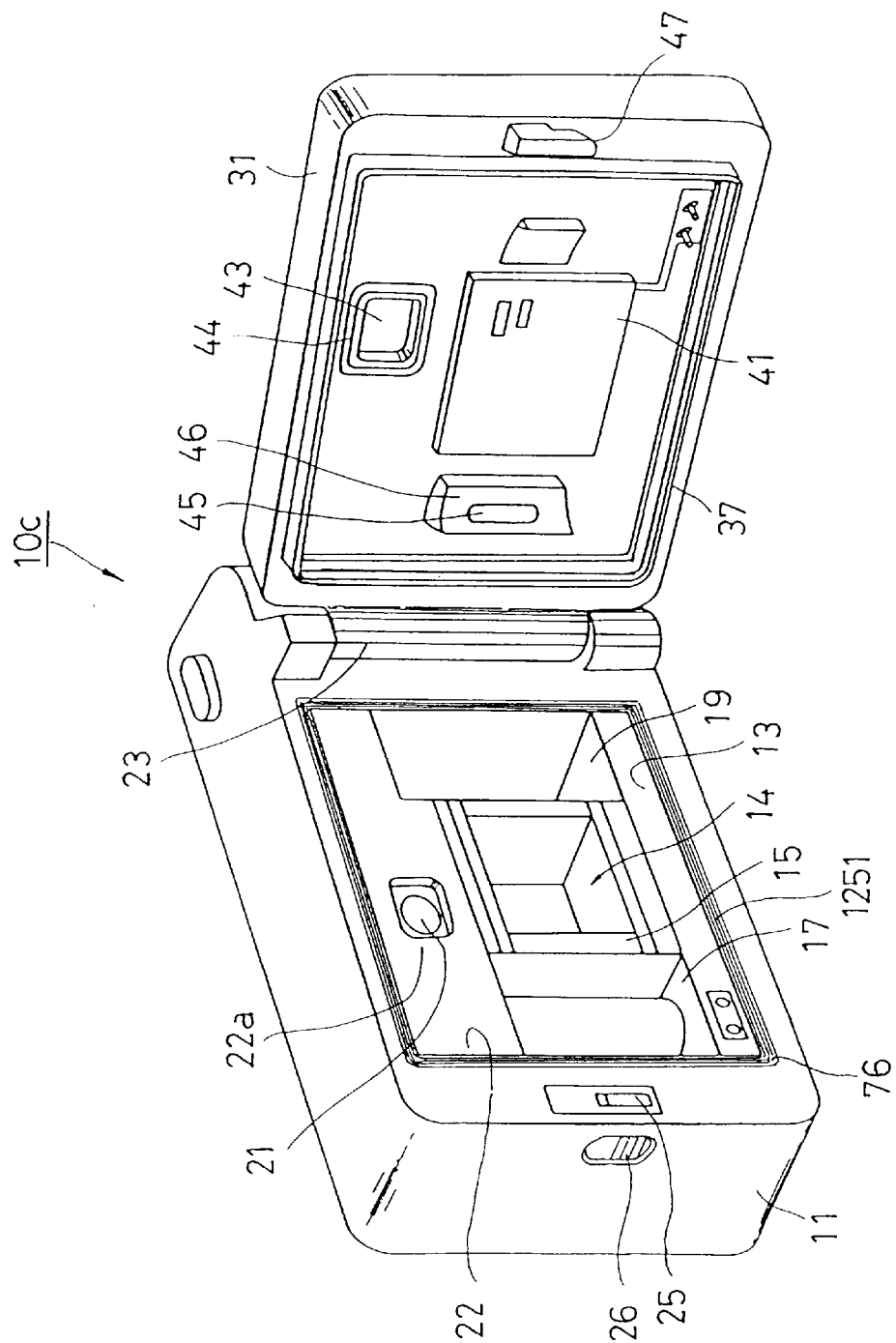
FIG. 28 is a perspective view of a waterproof and/or water-resistant camera, with its back cover opened, to which the present invention is applied, according to the fourteenth embodiment of the present invention.

FIGS. 24 and 25 show a fourteenth embodiment of the present invention. FIG. 28 shows a waterproof and/or water-resistant camera 10c, with its back cover 31 opened, to which the present invention is applied, according to the fourteenth embodiment of the present invention. In FIG. 28, all the members or parts which are substantially the same as those in FIGS. 7, 13 or 23 are designated with like reference numerals.

The opening 13 of the camera body 11 is surrounded by a groove 76 formed on the rear end of the camera body 11 around the opening 13. A sealing member 1251 made of an elastic and light-impermeable material such as black-colored rubber is fitted in the groove 76. The back cover 31 is provided with a rib 37 which is engaged with the sealing member 1251 to establish the watertight connection between the camera body 11 and the back cover 31 when the back cover 31 is closed.

The sealing member 1251 includes a base portion 1252 which comes into pressing contact with the tip 37a of the rib 37, and outer and inner tongues 1253 and 1254 integrally formed with the outer and inner edges of the base portion 1252, respectively. The bottoms of the outer and inner tongues 1253 and 1254 are integrally provided with leg portions 1253a and 1254a, respectively.

The sealing member 1251 is placed in the groove 76 with the base portion 1252 and the leg portions 1253a and 1254a are slightly compressed in the groove 76. In this state, the leg portions 1253a and 1254a are tightly adhered to the corresponding inner walls of the groove 76 by the biasing force of the base portion 1252 and the leg portions 1253a and 1254a so as to prevent water from entering into between the leg portions 1253a, 1254a and the inner walls of the groove 76. A space 77 is formed between the leg portions 1253a and 1254a and between the base portion 1252 and the bottom of the groove 76. The outer and inner tongues 1253 and 1254, the leg portions 1253a and 1254a, and the base portion 1252 are all formed entirely along the sealing member 1251.

FIG. 25 shows the state where the back cover 31 is closed, thereby the sealing member 1251 is brought into pressing contact with the rib 37. When the back cover 31 is closed, the tip 37a of the rib 37 comes into pressing contact with a contacting portion 1255 of the base portion 1252, the base portion 1252 is deformed towards the bottom of the groove 76, and then the leg portions 1253a and 1254a are also deformed, and thereby, the outer and inner tongues 1253 and 1254 are deformed towards the rib 37 as shown by the arrows in FIG. 25 to come into pressing contact with outer and inner surfaces 37b and 37c, respectively.

With the structure of the fourteenth embodiment, the watertight connection between the camera body 11 and the back cover 31 is maintained by the base portion 1252, the outer and inner tongues 1253 and 1254 coming into pressing contact with the tip 37a, the outer and inner surfaces 37b and 37c, respectively. In addition, the pressing force of the rib 37 to the base portion 1252 is partially converted to the pressing force of the outer and inner tongues 1253 and 1254 to the outer and inner surfaces 37b and 37c of the rib 37, respectively. Thereby the biasing force of the sealing member 1251 applied to the back cover 31 is reduced, so that the deformation of the back cover 31 due to the biasing force of the sealing member 1251 can be rendered small, and thus a high performance watertight connection is maintained.

Figure 26:
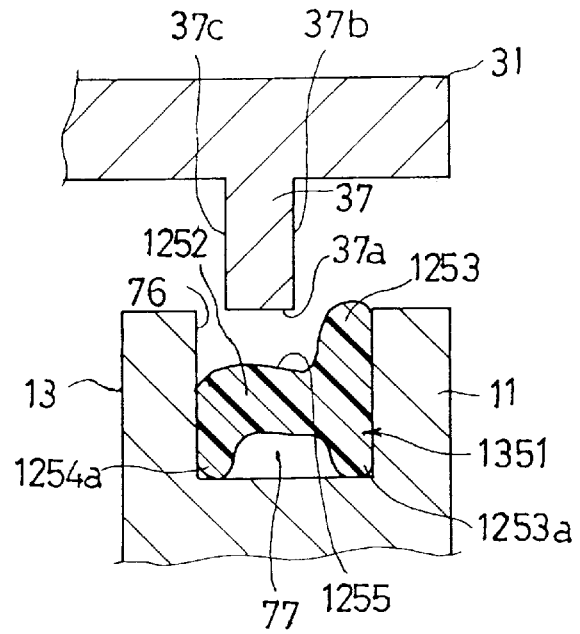
FIG. 26 is a cross-sectional view of a significant portion of a waterproof and/or water-resistant camera, with its back cover opened, to which the present invention is applied, according to the fifteenth embodiment of the present invention.
Figure 27:
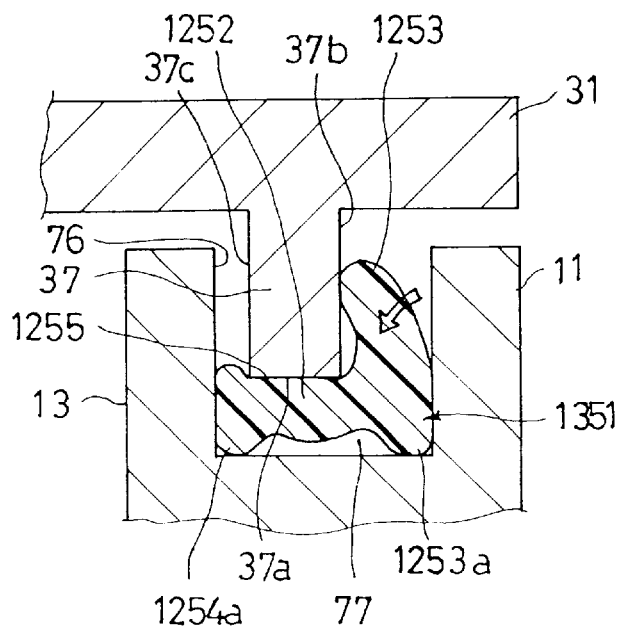
FIG. 27 is a cross-sectional view of the significant portion of the waterproof and/or water-resistant camera of FIG. 26, with its back cover closed.

FIGS. 26 and 27 show a fifteenth embodiment of the present invention. The fifteenth embodiment is the same as the fourteenth embodiment in structure except in that the shape of the sealing member 1351 is different from the sealing member 1251. Specifically, the sealing member 1351 is the same as the sealing member 1251 of the fourteenth embodiment except in that the sealing member 1351 is not provided with the inner tongue 1254 that the sealing member 1251 has. Therefore, portions of the sealing member 1351 which are the same as those of the fourteenth embodiment are designated with like reference numerals.

FIG. 27 shows the state where the back cover 31 is closed, thereby the sealing member 1351 is brought into pressing contact with the rib 37. When the back cover 31 is closed, the tip 37a of the rib 37 comes into pressing contact with a contacting portion 1255 of the base portion 1252, the base portion 1252 is then deformed towards the bottom of the groove 76, and then the leg portions 1253a and 1254a are deformed, and thereby, the tongue 1253 is deformed towards the rib 37 as shown by the arrow in FIG. 27 to come into pressing contact with outer surface 37b.

With the structure of the fifteenth embodiment, similar to the fourteenth embodiment, the watertight connection between the camera body 11 and the back cover 31 is maintained by the base portion 1252 and the tongue 1253 coming into pressing contact with the tip 37a and the outer surface 37b, respectively. In addition, similar to the fourteenth embodiment, the pressing force of the rib 37 to the base portion 1252 is partially converted to the pressing force of the tongue 1253 to the outer surface 37b of the rib 37, respectively. Thereby the biasing force of the sealing member 1351 applied to the back cover 31 is reduced, so that the deformation of the back cover 31 due to the biasing force of the sealing member 1351 can be rendered small and thus a high performance watertight connection is maintained.

In the above fourteenth and fifteenth embodiments, the sealing member 1251 or 1351 is provided on the camera body 11, and the rib 37 with which the sealing member 1251 or 1351 is engaged when the back cover 31 is closed is formed on the back cover 31. However, the sealing member 1251 or 1351 and the rib 37 may be provided on the back cover 31 and the camera body 11, respectively.

The present invention can be applied to various waterproof and/or water-resistant cameras, e.g., lens-shutter type cameras, SLR cameras, video cameras, etc. Furthermore, the present invention can be applied not only to the watertight connecting structure between a camera body and an openable back cover, but also to any other watertight connecting structure such as that between a camera body and an openable cover which opens and closes the battery compartment of the camera.

Those skilled in the art to which the invention relates will appreciate that various substitutions and modifications can be made to the described embodiments without departing from the spirit and scope of the invention as described by the claims below.

I claim:

1. A waterproof and/or water resistant camera comprising:

a camera body including an opening;

an openable cover connected to said camera body for opening and closing said opening;

an elastic sealing member provided on one of said camera body and said cover and surrounding said opening;

a contacting surface formed on an other of said camera body and said cover, said elastic sealing member coming into pressing contact with said contacting surface when said cover is closed;

an auxiliary pressing member that presses said elastic sealing member towards said contacting surface when said cover is closed, said auxiliary pressing member comprising a pressure portion formed on the one of said camera body and said cover on which said sealing member is provided; and an auxiliary elastic portion which is integrally formed with said sealing member and which comes into pressing contact with said pressure portion when said cover is closed; said sealing member comprises inner and outer tongues adjacent to each other, said inner tongue coming into pressing contact with said contacting surface when said cover is closed, and a part of said outer tongue is formed as said auxiliary elastic portion such that said pressure portion presses said inner tongue to said contacting surface through said auxiliary elastic portion when said cover is closed.

2. The waterproof and/or water-resistant camera of claim 1, wherein said inner tongue is formed longer than said outer tongue in a direction perpendicular to said cover.

3. The waterproof and/or water-resistant camera of claim 1, wherein said contacting surface is formed on said camera body around said opening to taper towards said cover when said cover is closed.

* * * * *